(12) United States Patent
Lloyd et al.

(10) Patent No.: US 6,467,334 B2
(45) Date of Patent: Oct. 22, 2002

(54) METHOD FOR QUICKLY RENDERING A MOS GAS SENSOR OPERATIONAL, MOS GAS SENSOR SYSTEM, AND FUEL CELL SYSTEM

(75) Inventors: Greg A. Lloyd; William A. Fuglevand, both of Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 0 days.

(21) Appl. No.: 09/854,056

(22) Filed: May 11, 2001

(65) Prior Publication Data

US 2001/0045118 A1 Nov. 29, 2001

Related U.S. Application Data

(63) Continuation-in-part of application No. 09/577,407, filed on May 17, 2000.

(51) Int. Cl.$^7$ ............................................... G01N 27/12
(52) U.S. Cl. ...................................................... 73/31.06
(58) Field of Search ........................................ 73/31.06

(56) References Cited

U.S. PATENT DOCUMENTS

| | | | |
|---|---|---|---|
| 3,498,844 A | 3/1970 | Sanderson .................... | 136/86 |
| 3,507,702 A | 4/1970 | Sanderson .................... | 136/86 |
| 3,528,858 A | 9/1970 | Hodgdon Jr. et al. ......... | 136/86 |
| 3,623,913 A | 11/1971 | Adlhart et al. ................ | 136/86 |
| 3,964,930 A | 6/1976 | Reiser .......................... | 136/86 |
| 3,969,145 A | 7/1976 | Grevstad et al. .............. | 136/86 |
| 4,192,906 A | 3/1980 | Maru .......................... | 429/13 |
| 4,276,355 A | 6/1981 | Kothmann et al. ........... | 429/26 |
| 4,313,338 A | 2/1982 | Abe et al. | |
| 4,459,577 A | 7/1984 | Murakami et al. ............ | 338/34 |
| 4,469,579 A | 9/1984 | Covitch et al. ............. | 204/283 |
| 4,575,441 A | 3/1986 | Murakami et al. ............ | 264/61 |
| 4,624,137 A | 11/1986 | Johnson et al. | |
| 4,658,632 A | 4/1987 | Sasaki ............................ | 73/23 |
| 4,661,411 A | 4/1987 | Martin et al. ................ | 428/421 |
| 4,701,739 A | 10/1987 | Sasaki .......................... | 338/34 |
| 4,718,991 A | 1/1988 | Yamazoe et al. .............. | 204/1 |
| 4,731,226 A | 3/1988 | Takahata et al. .............. | 422/98 |

(List continued on next page.)

FOREIGN PATENT DOCUMENTS

EP       1 111 703 A2     6/2001

OTHER PUBLICATIONS

U.S. patent application Ser. No. 09/322,666, Fugelavand et al., filed May 28, 1999.
U.S. patent application Ser. No. 09/577,407, Fuglevand et al., filed May 17, 2000.

Primary Examiner—Robert Raevis
(74) Attorney, Agent, or Firm—Wells St. John P.S.

(57) ABSTRACT

A method of speeding startup of a MOS gas sensor having a sensor element for sensing a target gas, and a heater configured to heat the sensor element, and which is responsive to a voltage applied thereto. The heater has an operating temperature which is selectively maintained by applying a first voltage thereto, and the heater further has a maximum recommended temperature which is selectively maintained by applying a second voltage thereto. The maximum recommended temperature is higher than the operating temperature, and the second voltage is higher than the first voltage. The method includes providing a third voltage to the heater which is greater than the second voltage for a predetermined amount of time which is selected to increase the temperature to a level not greater than the maximum recommended temperature in a shorter time period than if the second voltage is applied and maintained. A MOS gas sensor system and a fuel cell system also employ such a method.

45 Claims, 21 Drawing Sheets

U.S. PATENT DOCUMENTS

| | | |
|---|---|---|
| 4,769,297 A | 9/1988 | Reiser et al. ................. 429/17 |
| 4,795,536 A | 1/1989 | Young et al. ............... 204/129 |
| 4,795,683 A | 1/1989 | McElroy ....................... 429/13 |
| 4,797,185 A | 1/1989 | Polak et al. ................ 204/129 |
| 4,801,211 A | 1/1989 | Yagi et al. |
| 4,816,800 A | 3/1989 | Onaga et al. ................. 338/34 |
| 4,818,637 A | 4/1989 | Molter et al. ................ 429/15 |
| 4,826,741 A | 5/1989 | Aldhart et al. ............... 429/19 |
| 4,826,742 A | 5/1989 | Reiser ......................... 429/33 |
| 4,827,154 A | 5/1989 | Naoyuki et al. ............ 307/116 |
| 4,876,115 A | 10/1989 | Raistrick .................... 427/116 |
| 4,938,928 A | 7/1990 | Koda et al. ................... 422/98 |
| 4,958,513 A | 9/1990 | Yasunaga et al. ............ 73/23.2 |
| 4,988,582 A | 1/1991 | Dyer ........................... 429/30 |
| 5,006,828 A | 4/1991 | Yutaka et al. ................. 338/34 |
| 5,084,144 A | 1/1992 | Reddy et al. ............... 205/104 |
| 5,132,193 A | 7/1992 | Reddy et al. ................. 429/13 |
| 5,242,764 A | 9/1993 | Dhar ........................... 429/30 |
| 5,318,863 A | 6/1994 | Dhar ........................... 429/30 |
| 5,507,175 A | 4/1996 | Cooper ...................... 73/29.02 |
| 5,716,506 A | 2/1998 | Maclay et al. |
| 5,719,778 A * | 2/1998 | Suzumura et al. ..... 364/477.01 |
| 5,739,416 A | 4/1998 | Hoenk |
| 5,759,367 A | 6/1998 | Matsuura et al. |
| 5,814,970 A | 9/1998 | Schmidt ..................... 320/118 |
| 5,821,729 A | 10/1998 | Schmidt et al. ................ 320/6 |
| 5,918,261 A | 6/1999 | Williams et al. |
| 5,969,231 A | 10/1999 | Qu et al. |
| 6,001,499 A | 12/1999 | Grot et al. .................... 429/22 |
| 6,030,718 A | 2/2000 | Fuglevand et al. ............ 429/26 |
| 6,096,449 A | 8/2000 | Fuglevand et al. ........... 429/13 |
| 6,126,311 A | 10/2000 | Schuh |
| 6,155,098 A | 12/2000 | Shapiro et al. |

\* cited by examiner

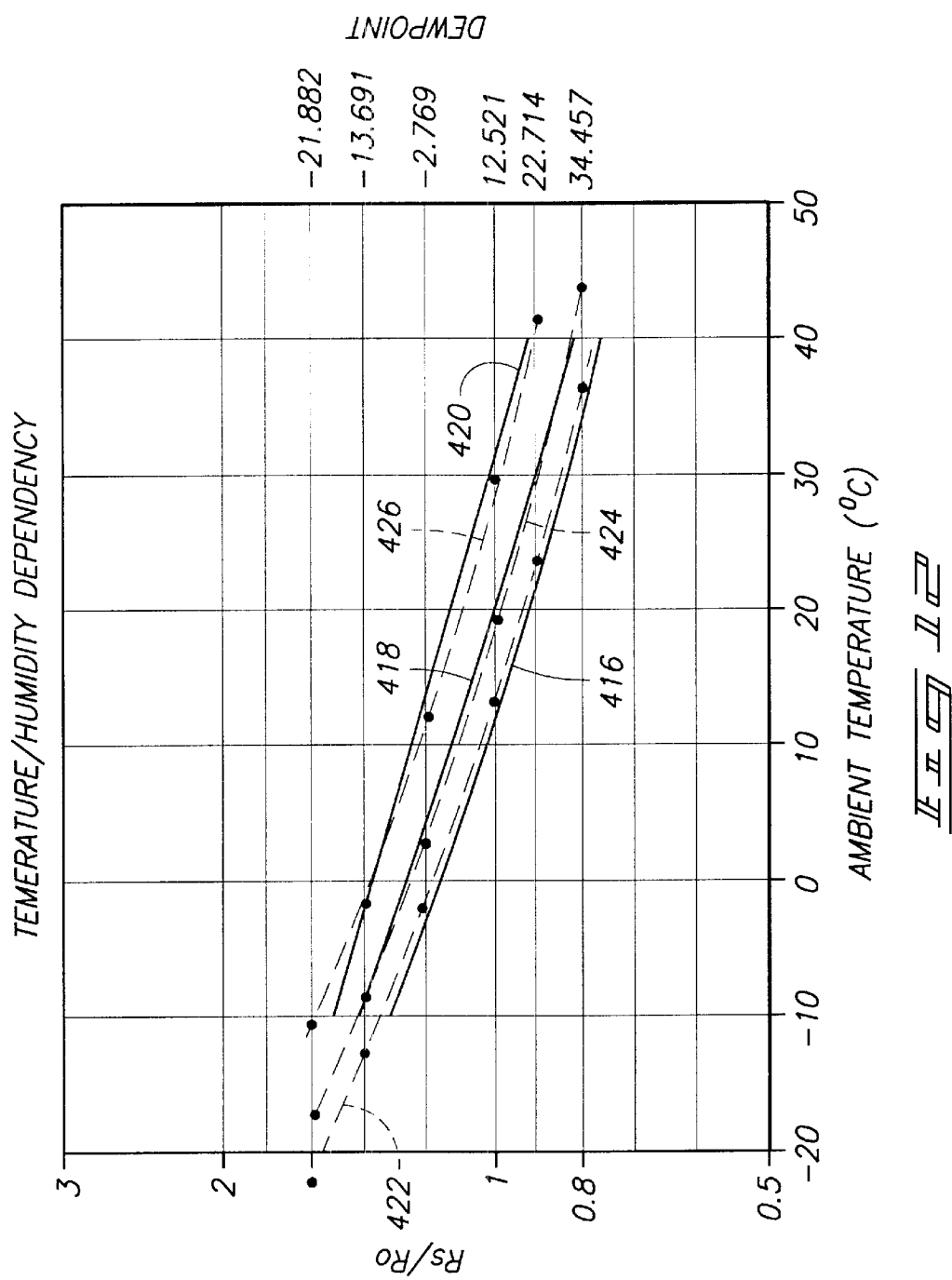

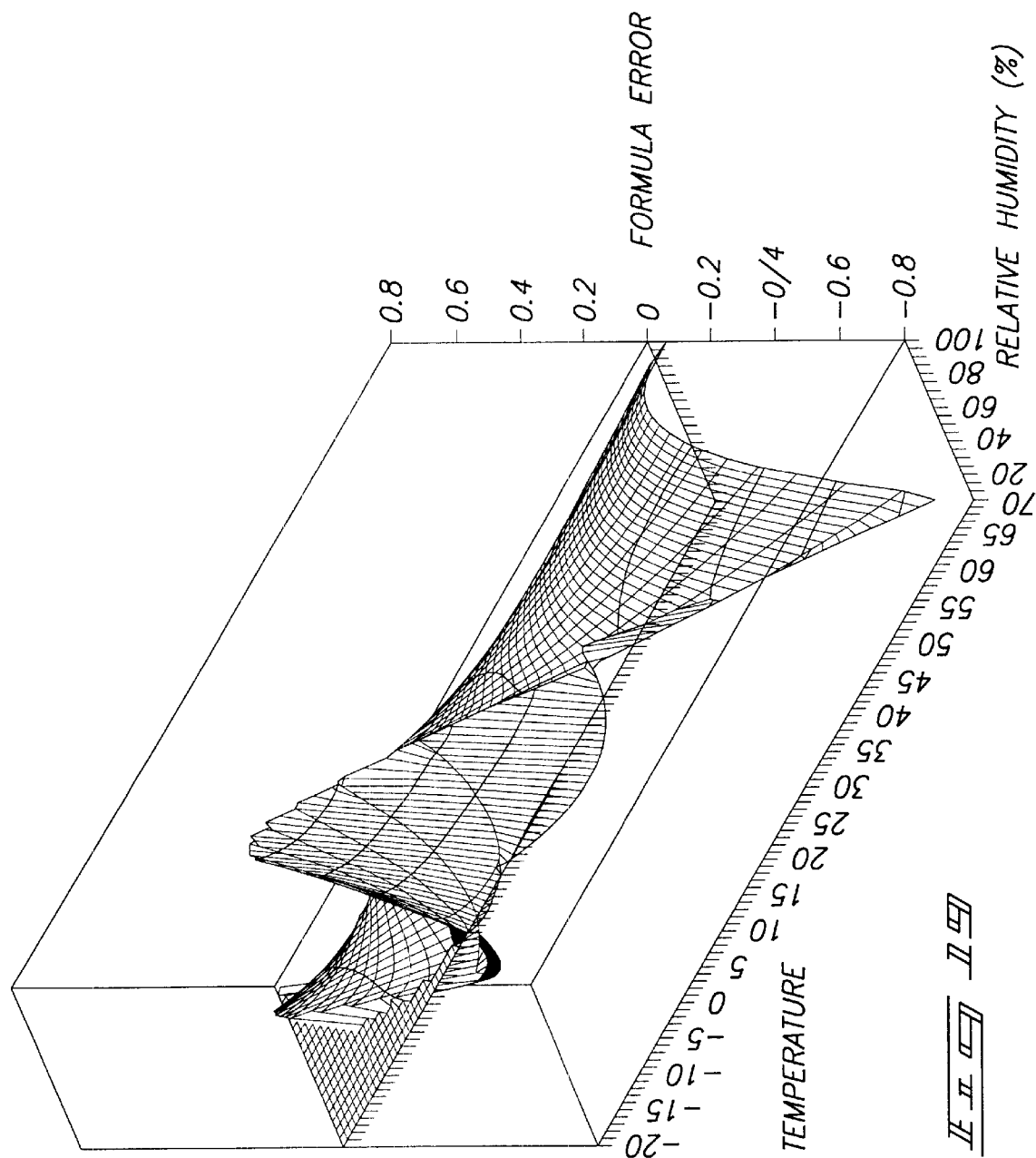

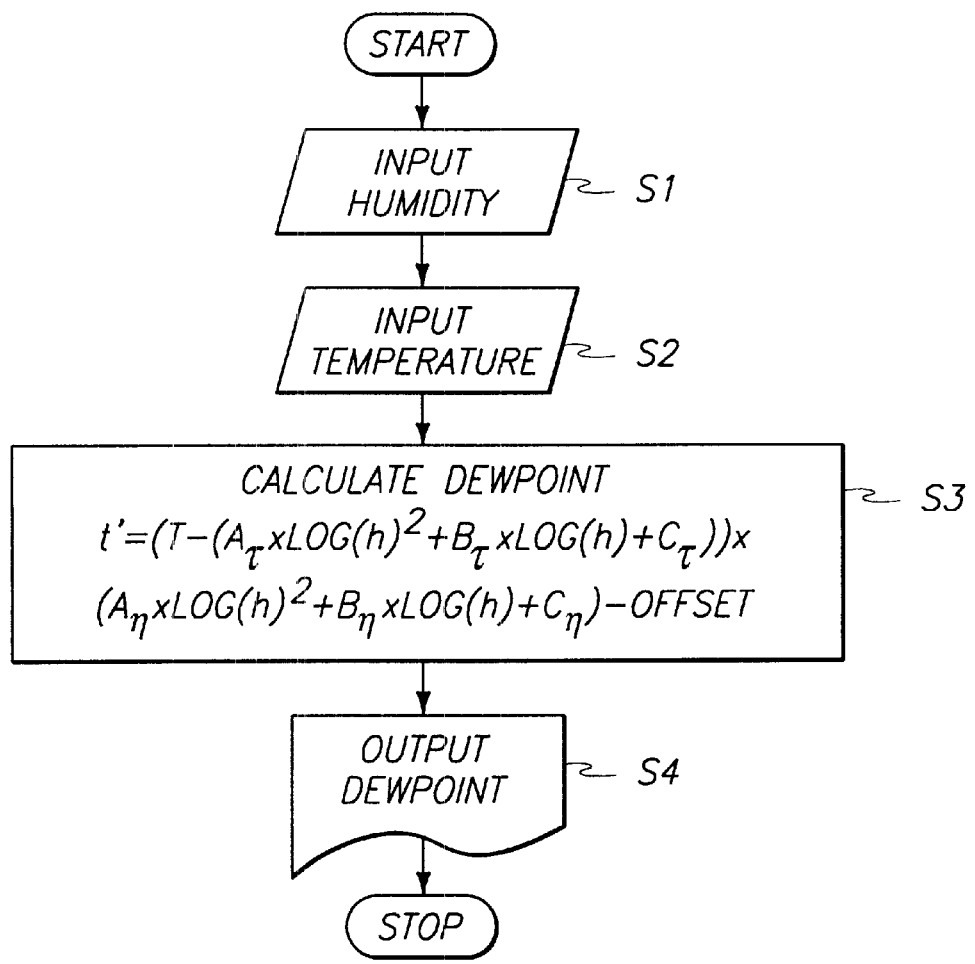

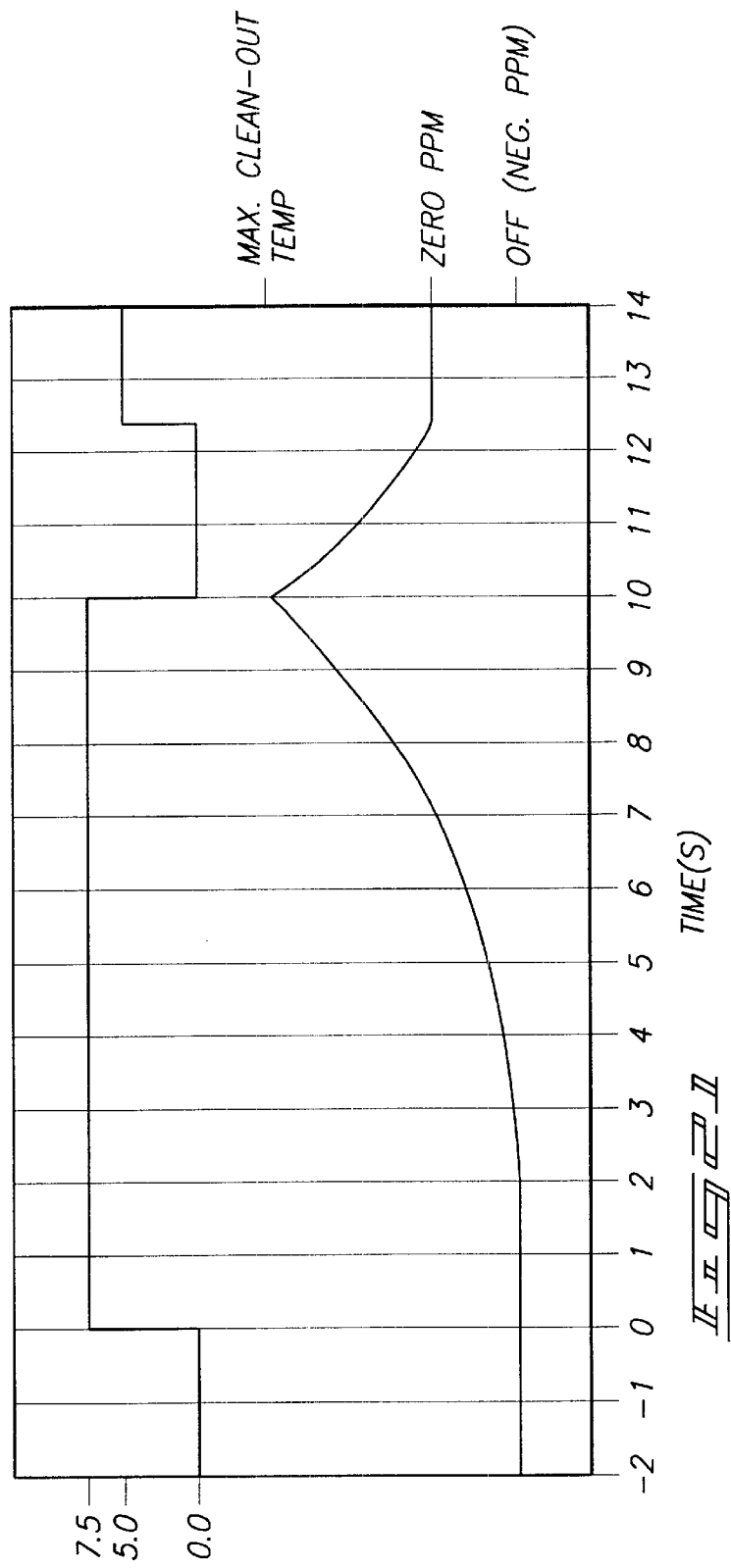

METHOD FOR QUICKLY RENDERING A MOS GAS SENSOR OPERATIONAL, MOS GAS SENSOR SYSTEM, AND FUEL CELL SYSTEM

RELATED PATENT DATA

This application is a continuation-in-part of U.S. patent application Ser. No. 09/577,407, which was filed on May 17, 2000 and which is incorporated by reference herein.

TECHNICAL FIELD

The invention relates to fuel cell systems and gas sensors employed with same. The invention also relates to metal oxide semiconductor gas sensors and a method for quickly rendering MOS gas sensors operational.

BACKGROUND OF THE INVENTION

For safety purposes, gas-sensing instruments are used in many industrial applications such as in fuel cell systems whose feedstocks are flammable gases. It is well known that many gas sensors—metal oxide semiconductor (MOS) based sensors in particular—suffer from environmental dependencies. That is, ambient temperature and relative humidity substantially affect their sensitivity. For example, one commercially available MOS sensor model is the Figaro TGS821 hydrogen sensor. Due to the combination of this sensor's environmental dependencies and the environmental uncertainties to which it will be exposed to in certain fuel cell applications, a sensor reporting a reading of 526 PPM of hydrogen might actually be exposed to a true concentration ranging between 182 and 1627 PPM. In certain fuel cell applications, the lower reading would be regarded as being well below alarm-level whereas the higher reading would be regarded as being well above. This 8.9:1 range of uncertainty is the source of much frustration with uncompensated MOS gas sensors.

Accordingly, many designers of gas sensing instruments elect to compensate for MOS gas sensors' environmental dependencies. The conventional wisdom is that this requires a microprocessor, firmware (software), and lookup charts. However, dependence upon firmware being perpetually executed without error in a microprocessor-based circuit greatly complicates efforts to design a highly reliable, fail-safe gas-sensing instrument. Furthermore, the conventional method produces compensation factors that are inexact approximations of the required values.

Attention is directed toward the following U.S. patents, which are incorporated herein by reference: U.S. Pat. No. 5,716,506 to Maclay et al.; U.S. Pat. No. 4,313,338 to Abe et al.; U.S. Pat. No. 4,801,211 to Yagi et al.; U.S. Pat. No. 6,126,311 to Schuh; and U.S. Pat. No. 5,969,231 to Qu et al.

U.S. Pat. No. 5,716,506 to Maclay et al. discloses (see Col. 1) a gas sensor that compensates for relative humidity and temperature of the air in the detection of a predetermined gas in a microfabricated electrochemical sensor.

U.S. Pat. No. 4,313,338 to Abe et al. relates to a gas sensing device comprising a resistive film formed of ultra fine particles of a metal oxide (Col. 4, lines 10–15). The gas sensing device includes (Col. 7, line 43-Col 8, line 65) a temperature sensing element for maintaining the temperature of the gas sensitive element constant. U.S. Pat. No. 4,313,338 also discloses obviating the problem of water vapor obstructing the successful measurement of the concentration of gas by using a single gas sensing element to sense both the concentration of water vapor and the concentration of isobutane gas (see Col. 8, line 47–Col. 9, line 11). The gas sensing element is heated up to 300 degrees Celsius during the measurement of the concentration of the isobutane gas and is cooled down to the room temperature of 25 degrees C. during the measurement of relative humidity.

U.S. Pat. No. 4,801,211 to Yagi et al. discloses (see Abstract) a humidity sensor that, when temperature corrected, indicates a dew point at a fixed temperature. By adjusting this fixed temperature dew point output according to a sensed temperature, the dew point can be detected. FIG. 2 shows all analog circuitry. The sensor is made of metal oxide ceramic material (see Col. 4, lines 44–46).

U.S. Pat. No. 6,126,311 to Schuh discloses (see FIG. 4) a sensor that outputs dew point, ambient temperature, and relative humidity. This patent discloses (see Col. 1, lines 14–20) that the relative humidity and dew point of a gaseous sample are closely related by well known algorithms for converting dew point and ambient temperature to relative humidity or converting relative humidity and ambient temperature to dew point. This patent also indicates (see Col. 2, lines 19–23) that a group of prior art sensors measure the relative humidity of an ambient environment as opposed to dew point, and that relative humidity and dew point are easily converted from one to the other with a measurement of the ambient air temperature.

U.S. Pat. No. 5,969,231 to Qu et al. discloses a sensor for monitoring the concentration of moisture and gaseous substances in the air. Semiconductive metal oxides are used (see Col. 1).

Notwithstanding the prior art teachings noted above, none of these references singularly or in any permissible combination teach a simple approach for compensating gas sensor measurements for both humidity and temperature at the same time. Further, none of these references offer a reasonable solution to the problem of slow start-up times for these same sensors. It would be advantageous therefore, to be able to perform such compensation utilizing analog circuitry, which would be highly reliable and substantially fail-safe, and to further provide a method whereby these sensors could be rendered fully operational in a relatively short period of time.

As noted above, gas sensors are used, in various industrial applications, such as in the fabrication of fuel cells. For example, gas sensors configured to sense hydrogen can be employed to detect hydrogen fuel leaks or hydrogen fuel flow in the fuel cells. In this regard, attention is directed to commonly assigned U.S. patent application Ser. No. 09/322,666 filed May 28, 1999, listing as inventors Fuglevand et al., and which is incorporated by reference herein. This application discloses the particulars of how gas sensors can be employed in one form of a fuel cell system.

Metal oxide semiconductor sensors typically require some time to "warm up", stabilize and thereby be rendered operational. Still further, many MOS sensors have cross-sensitivities to non-target gases. For example, if the target gas is hydrogen and the selected sensor has a cross-sensitivity to alcohol (as does the Figaro TGS813, for example), then even a perfumed person walking by the sensor can provoke a hydrogen alarm. In light of this, the sensor used in fuel cell applications, to sense the presence of fuel is preferably selected with cross-sensitivity in mind. For example, the Figaro TGS821, which is used as the sensor 400 in the illustrated embodiment, is less susceptible than other commercially available models, including the Figaro TGS813, but this same effect can still cause problems during operation and startup.

In addition to the foregoing, this cross-sensitivity causes problems at A startup because high-molecular-weight volatile organic compounds (VOCs) can deposit onto the sensor element while the fuel cell is off (and the sensor element is cold). Upon startup, the volatile organic compounds begin to decompose and evaporate. The sensor can then sense these byproducts and can output false positives upon startup. Though the sensor element referenced above may reach an operating temperature within about a minute, it can take several additional minutes to boil-off or evaporate stubborn volatile organic compounds from off of the sensor and thereby obtain a stable reading.

In the case of the commercially available Figaro model TGS813 sensor, for example, the manufacturer recommends accelerating this process by applying 6 V to the heater for 60 seconds. This raises the sensor temperature to about 600° C. in order to facilitate the burn-off of stubborn volatile organic compounds that would otherwise only slowly burn-off at operating temperatures of 500° C. or less. The manufacturer does not provide similar information on the TGS821. This model is used to sense the presence of hydrogen fuel gas in fuel cell systems, for example. The manufacturer does, however, advise that the burn-off time can be accelerated for another of their sensors, the TGS812, by applying 6.5 V for 15 seconds. After this time period, 5 V is applied and, after waiting for another half-minute for the reading to stabilize, the sensor can be expected to provide reasonably valid data.

The sensor element inside the model TGS821 normally operates at 500° C. and, according to the manufacturer, should not experience temperatures in excess of 600° C. An input of 6.0 V to the sensor 400 will produce a 600° C. equilibrium temperature. In practice, it takes about one minute of heating for the sensor element to ramp up and stabilize at either of these 500 to 600° C. equilibrium temperatures.

It would be advantageous if the sensors noted above could be rendered operational in short periods of time. This would permit readings to be taken more promptly. In a situation where the target gas being sensed by the sensor is a fuel or is poisonous, for example, it can be particularly important, for safety reasons, to be able to take accurate readings in the shortest time period possible.

BRIEF DESCRIPTION OF THE DRAWINGS

Preferred embodiments of the invention are described below with reference to the following accompanying drawings.

FIG. 12 is a graph illustrating the effects of temperature and humidity on the same MOS gas sensor.

FIG. 13 is a graph illustrating dewpoints plotted against Rs/Ro values for the same MOS sensor.

FIG. 14 is a graph illustrating environmental Rs/Ro relationships using dewpoints for the same MOS gas sensor.

FIG. 19 is a graph illustrating error in one formula for determining dewpoint from temperature and humidity.

FIG. 20 is a flowchart illustrating logic used by digital circuitry or by a programmed general purpose computer or a processor for determining dewpoint from relative humidity and temperature.

FIG. 21 illustrates a method for quickly rendering a MOS gas sensor operational.

FIG. 22 is a chart illustrating how the MOS gas sensor is controlled to produce the voltages illustrated in FIG. 21.

DETAILED DESCRIPTION OF THE PREFERRED EMBODIMENTS

Figure 1:
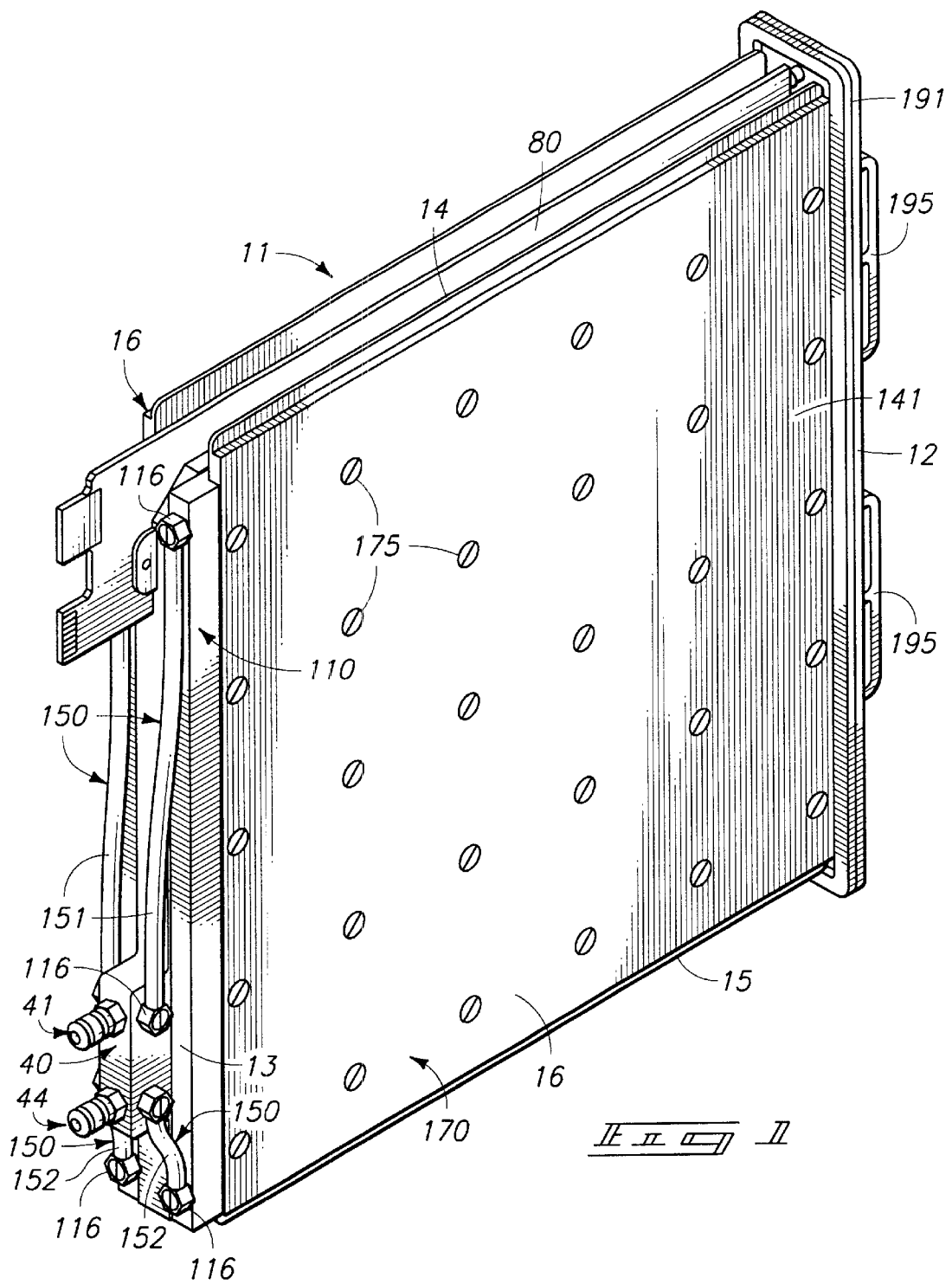
FIG. 1 is a perspective, side elevation view of an ion exchange membrane fuel cell module which is utilized with a fuel cell power system embodying the present invention.

This disclosure of the invention is submitted in furtherance of the constitutional purposes of the U.S. Patent Laws "to promote the progress of science and useful arts" (Article 1, Section 8).

The present invention provides a method of rendering a MOS hydrogen gas sensor operational, and which has a sensor element for sensing a target gas, and a heater configured to heat the sensor element and which is responsive to a voltage applied thereto, and where the heater has an operating temperature which is selectively maintained by applying a first voltage thereto, and the heater further has a maximum recommended temperature which is selectively maintained by applying a second voltage thereto, and wherein the maximum recommended temperature is higher than the operating temperature, and the second voltage is higher than the first voltage, and wherein the method further includes providing a third voltage to the heater which is greater than the second voltage for a predetermined amount of time which is selected to increase the temperature to a level not greater than the maximum recommended temperature in a shorter time period than if the second voltage is applied and maintained; causing the heater to cool faster than if the first voltage is applied; and providing the first voltage after causing the heater to cool.

Another aspect of the invention relates to a method of quickly rendering a MOS gas sensor operational, and which has a sensor element for sensing a target gas, and a heater configured to heat the sensor element and which is responsive to a voltage applied thereto. The heater has an operating temperature which is selectively maintained by applying a first voltage thereto, and the heater further has a maximum recommended temperature which is selectively maintained by applying a second voltage thereto. The maximum recommended temperature is higher than the operating temperature and the second voltage is higher than the first voltage. The method further includes providing a third voltage to the heater which is greater than the second voltage and which increases the temperature toward the maximum recommended temperature in a shorter time period than if the second voltage is applied and maintained; reducing the voltage provided to the heater from the third voltage to a fourth voltage which is less than the first voltage to reduce the temperature of the heater in a shorter time period than if the first voltage is applied and maintained; and providing the first voltage to the heater after reducing the voltage to the fourth voltage.

Another aspect of the invention relates to a method of quickly rendering a MOS hydrogen gas sensor operational and which has a sensor element for sensing a target gas, and a heater configured to heat the sensor element and which is responsive to a voltage applied thereto. The heater has a pre-use temperature, and an operating temperature of about 500 degrees Celsius which is selectively maintained by applying a voltage of about 5.0 Volts thereto. The heater further has a maximum recommended temperature of about 600 degrees Celsius which is selectively maintained by applying a voltage of about 6.0 Volts thereto. The method includes providing a voltage of about 7.5 Volts to the heater for about 10 seconds; eliminating the voltage to the heater for about 2.4 seconds after providing the voltage of about 7.5 Volts; and providing about 5.0 Volts to the heater after elimination of the voltage.

Another aspect of the invention relates to a MOS gas sensor system which includes a sensor element for sensing a target gas, and a heater configured to heat the sensor element and which is responsive to a voltage applied thereto. The heater has an operating temperature which is selectively maintained by applying a first voltage thereto, and the heater further has a maximum recommended temperature which is selectively maintained by applying a second voltage thereto. The maximum recommended temperature is higher than the operating temperature and the second voltage is higher than the first voltage. Circuitry is provided which provides a third voltage to the heater which is greater than the second voltage for a predetermined amount of time selected and which increases the temperature to a level which does not exceed the maximum recommended temperature in a shorter time period than if the second voltage is applied and maintained.

Yet another aspect of the present invention relates to a fuel cell system which includes a housing having a fuel gas inlet and an exhaust outlet; and at least one ion exchange fuel cell membrane positioned within the housing. A MOS gas sensor is provided and which includes a sensor element for sensing a target gas, and a heater configured to heat the sensor element and which is responsive to a voltage applied thereto. The heater has an operating temperature which is selectively maintained by applying a first voltage thereto, and the heater further has a maximum recommended temperature which is selectively maintained by applying a second voltage thereto. The maximum recommended temperature is higher than the operating temperature, and the second voltage is higher than the first voltage. A controller is coupled to the ion exchange fuel cell membrane and to the MOS gas sensor and is configured to provide a third voltage to the heater which is greater than the second voltage for a predetermined amount of time to increase the temperature to a level which does not exceed the maximum recommended temperature in a shorter time period than if the second voltage is applied and maintained.

Figure 8:
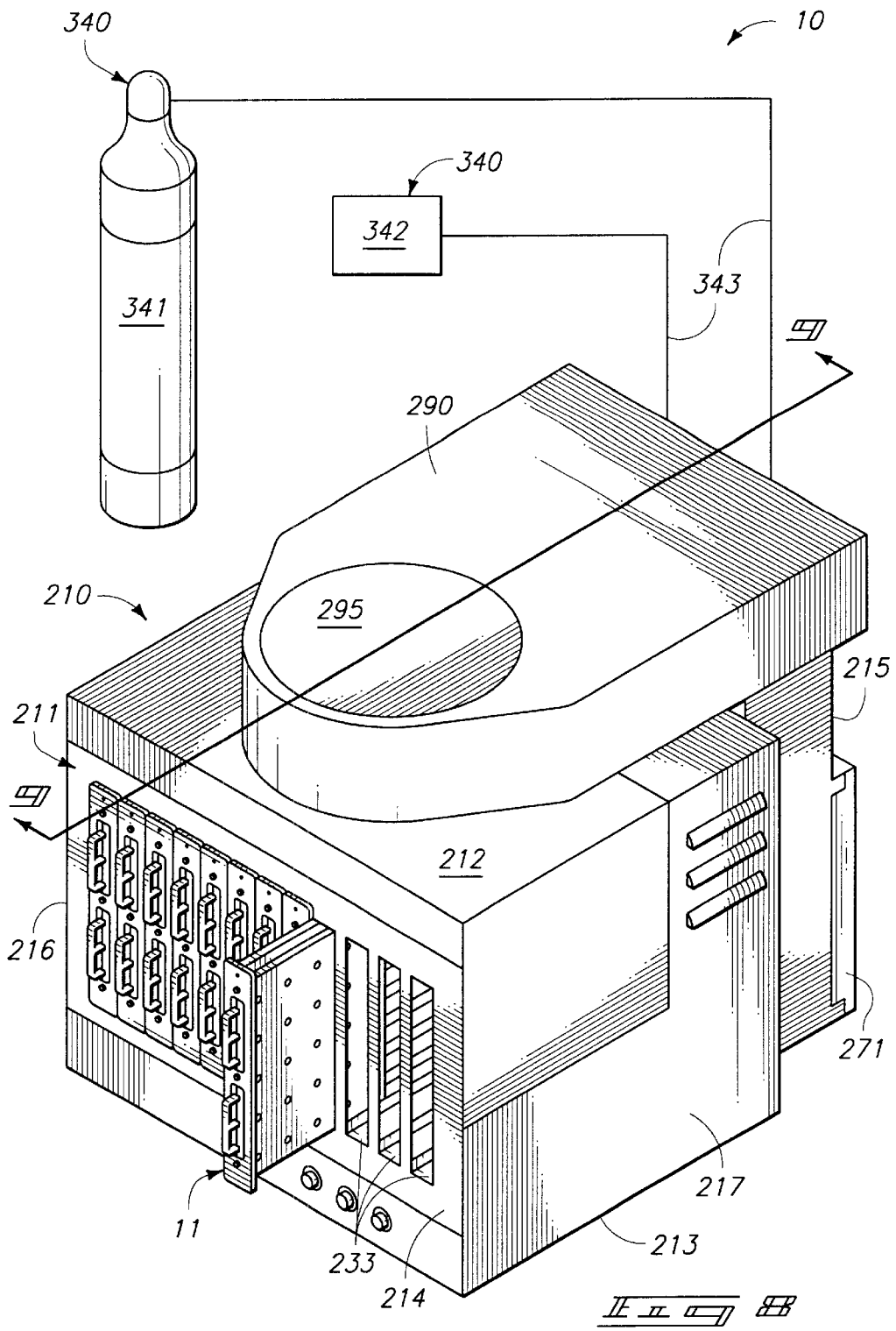
FIG. 8 is a perspective view of an ion exchange membrane fuel cell subrack and associated fuel gas supply.

As best seen in FIG. 8, an ion exchange membrane fuel cell power system 10 is made up of a plurality of fuel cell modules 11, one of which is shown in FIG. 1. The ion exchange membrane fuel cell power system 10 may include a plurality of subsystems or subracks 210. As illustrated each subsystem or subrack 210 includes a plurality of hand manipulable modules 11 (FIG. 1) which respectively have a forward edge 12, an opposite, rearward edge 13, top and bottom surfaces or edges 14 and 15, and opposite sidewalls generally indicated by the numeral 16. Each facet of the module 11 will be discussed in greater detail hereinafter. Yet further those should recognize that the present invention could be employed with conventional stack-like technology wherein the individual subsystem comprises fuel cell stacks arranged in a manner which is consistent with the further teachings of this application.

Figure 2:
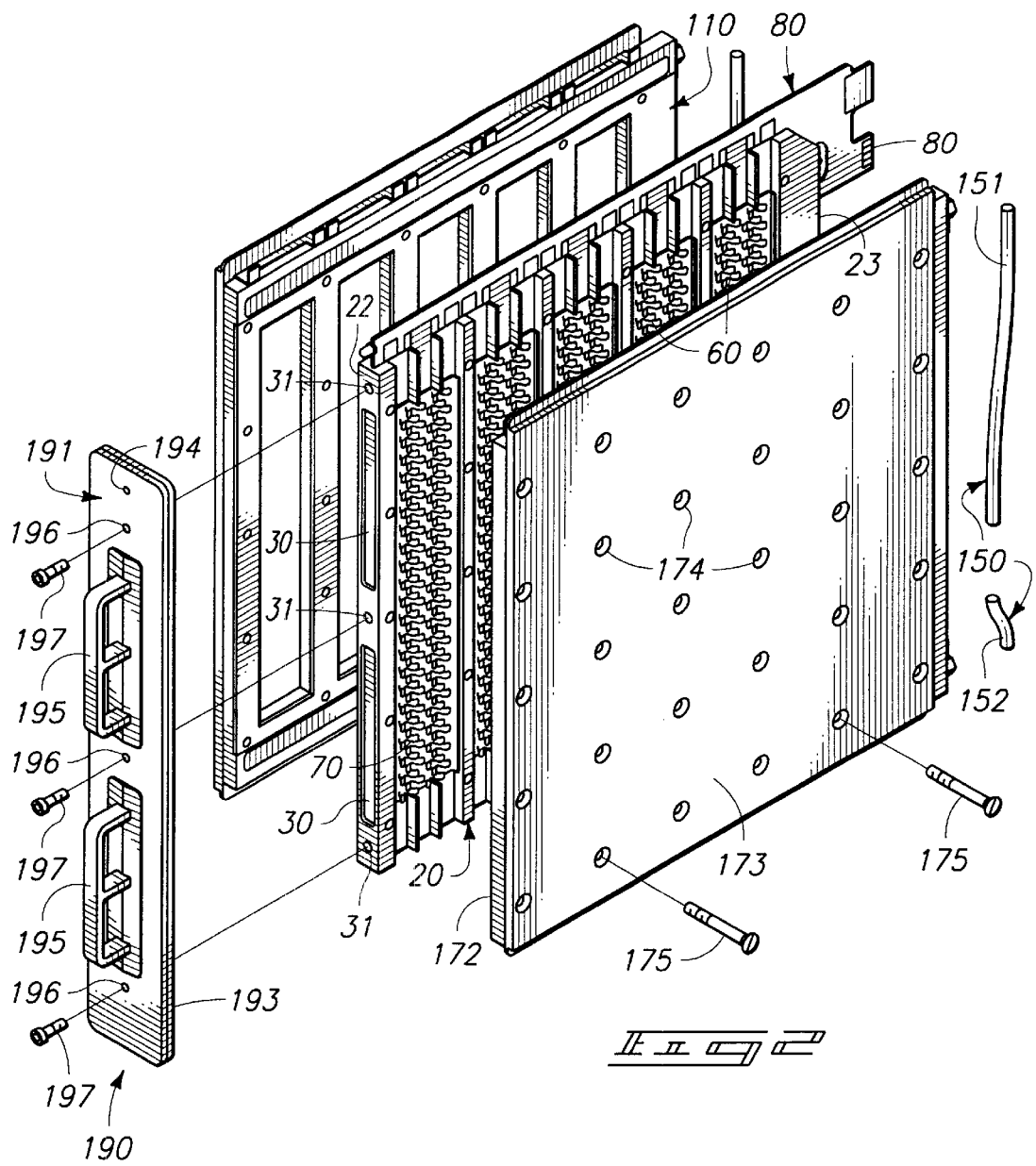
FIG. 2 is a perspective, exploded, side elevation view of an ion exchange membrane fuel cell module as seen in FIG. 1.
Figure 3:
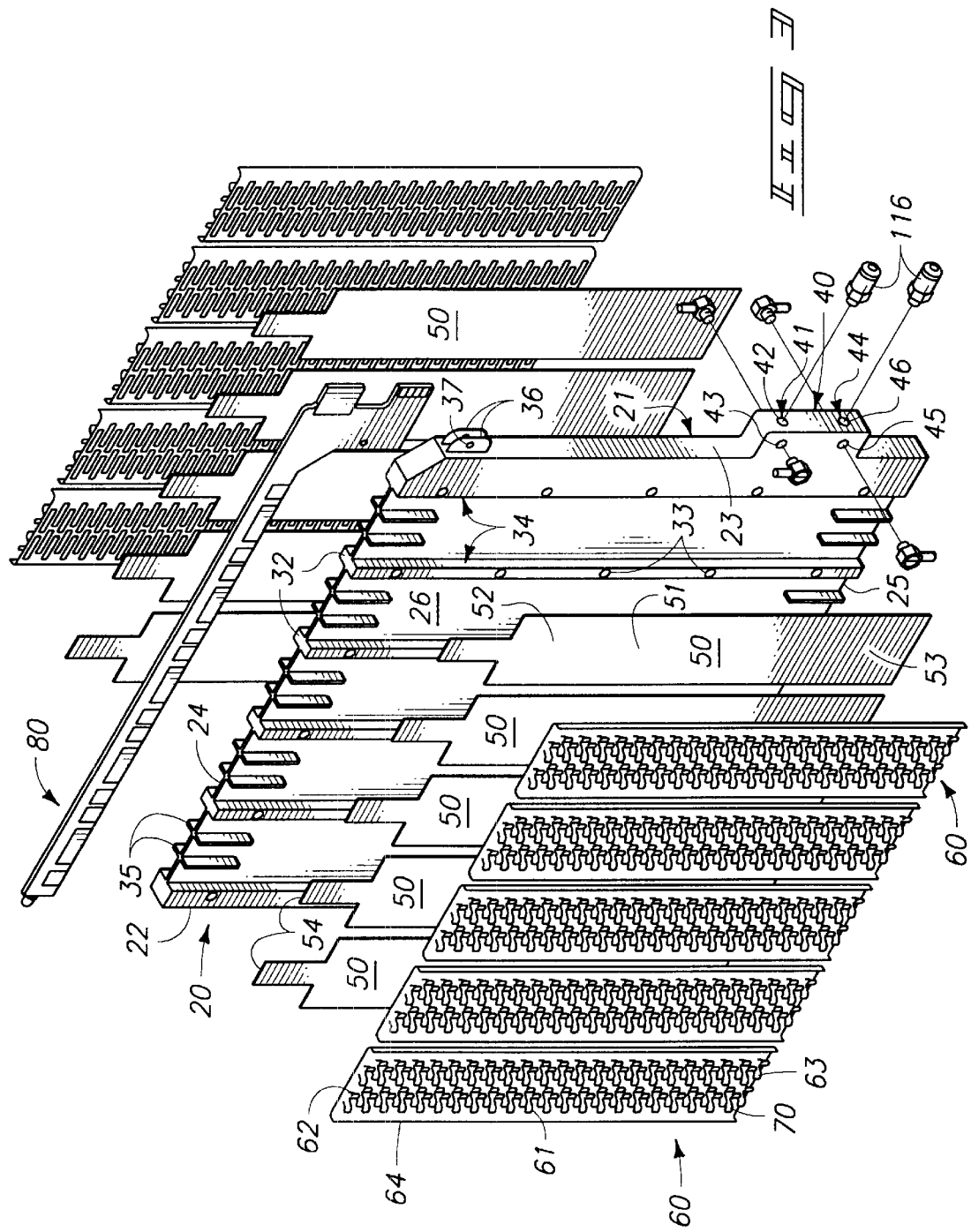
FIG. 3 is a perspective, partial, exploded, side elevation view of an ion exchange membrane fuel cell module as seen in FIG. 1.

As best seen in FIGS. 2 and 3, the fuel cell module 11 includes a nonconductive, dielectric support member generally indicated by the numeral 20. The support member can be fashioned out of various synthetic polymeric substrates. The support member has (see FIG. 3) a main body 21, which is defined by a forward peripheral edge 22; a rearward peripheral edge 23; a top peripheral edge 24; an opposite, bottom peripheral edge 25; and opposite sidewalls generally indicated by the numeral 26.

As best seen in FIG. 2, a pair of recessed channels 30 are formed in the forward peripheral edge 22. Further, a plurality of fastener receiving passageways or apertures 31 are also formed in the forward peripheral edge 22. Yet further, and as seen in FIG. 3, a plurality of spaced ribs 32 are borne by, or made integral with the respective sidewalls 26 and are disposed in spaced relation, one to the other. Fastener passageways or apertures 33 are formed through each of the ribs. Further, cavities 34 are defined between the respective ribs 32 on each sidewall. The cavities 34 formed on each of the sidewalls are disposed in substantially opposed relation one to the other. This is seen in FIG. 3.

Further, as best seen in FIG. 3, orientation members 35 are disposed between each of the ribs 32 and define a space therebetween. A pair of mounting tabs 36 are provided in spaced relationship, one to the other, on the rearward peripheral edge 23 of the main body 21. A pair of substantially coaxially aligned apertures 37 are individually formed in each of the mounting tabs 36 and are operable to receive a fastener therethrough.

A fuel coupling 40 is made integral with or forms a portion of the rearward peripheral edge 23 of the support member 20. The fuel coupling 40 includes a fuel delivery passageway 41 which is substantially T shaped and which is defined by an intake end 42 and a pair of exhaust ends labeled 43. Additionally, the fuel coupling also includes an exhaust passageway 44 which is also substantially T shaped and which is defined by a pair of intake ends 45, and an exhaust end 46. The operation of the fuel coupling 40 will be discussed in greater detail hereinafter.

As best seen in FIGS. 2 and 3, individual conductor plates generally designated by the numeral 50 are matingly received within the individual cavities 34 which are defined by the support member 20. The conductor plates which are fabricated from an electrically conductive substrate, have a substantially planar main body 51, which has a first end 52, and an opposite, second end 53. The main body 51 further has a conductive tab 54 which extends outwardly relative to the first end 52, and which is oriented between the individual orientation members 35. The conductive tab extends substantially normally outwardly relative to the top peripheral edge 24 of the support member 20. As will be recognized, the main body 51 matingly rests between the individual ribs 32 which define, in part, the respective cavities 34.

As best seen in the exploded view of FIG. 3, a cathode current collector is generally designated by the numeral 60, and rests in ohmic electrical contact with the main body 51 of the individual conductor plates 50. The cathode current collector, which is fabricated from an electrically conductive substrate, has a main body 61 which has opposite first and second ends 62 and 63, respectively. The cathode current collector simultaneously performs the functions of current collection, force application and heat dissipation. Still further, the main body 61 of the current collector 60 is defined by a peripheral edge 64.

Figure 4:
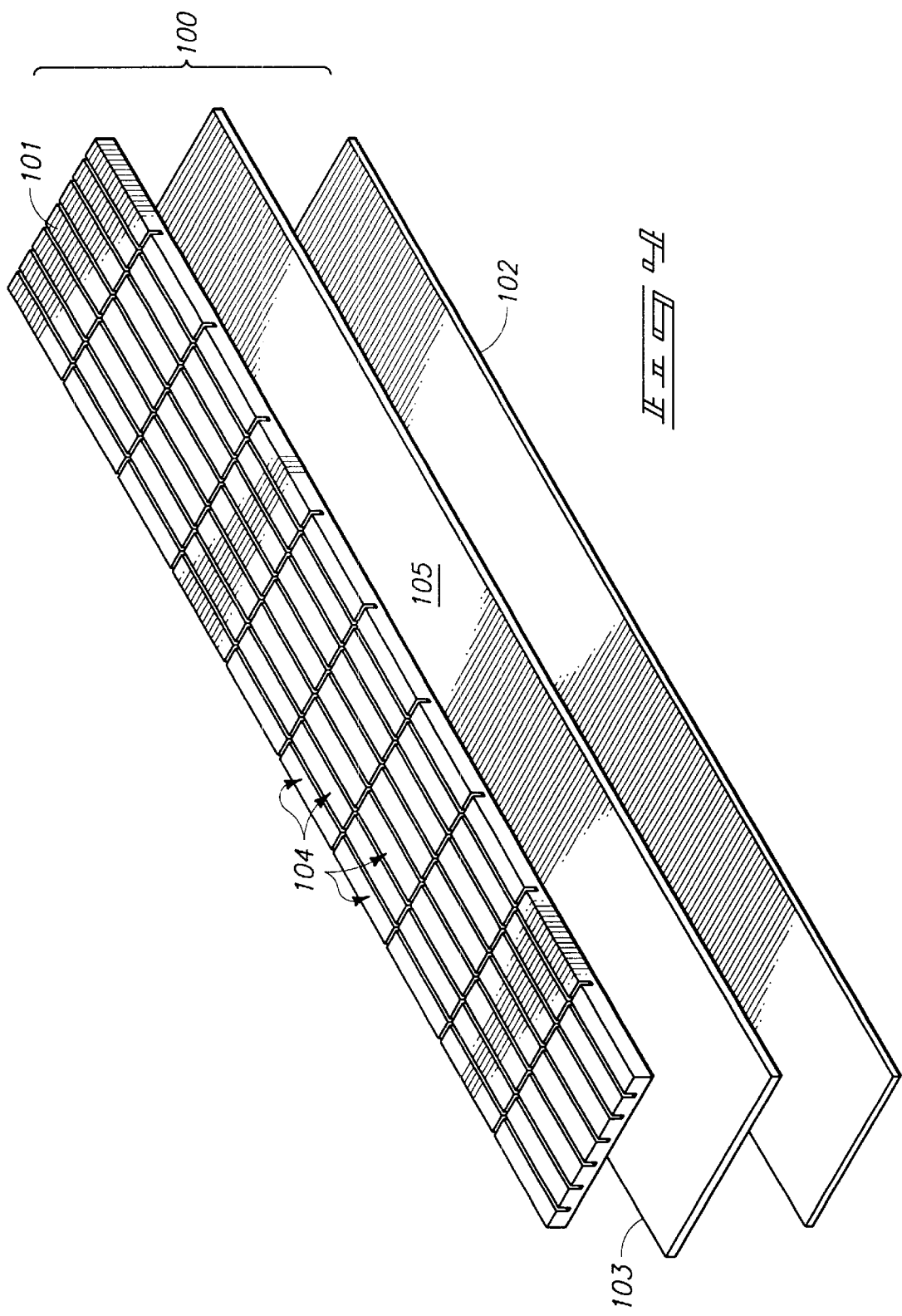
FIG. 4 is a fragmentary, perspective, greatly enlarged, exploded view of a membrane electrode diffusion assembly employed with the ion exchange membrane fuel cell module as seen in FIG. 1.
Figure 7:
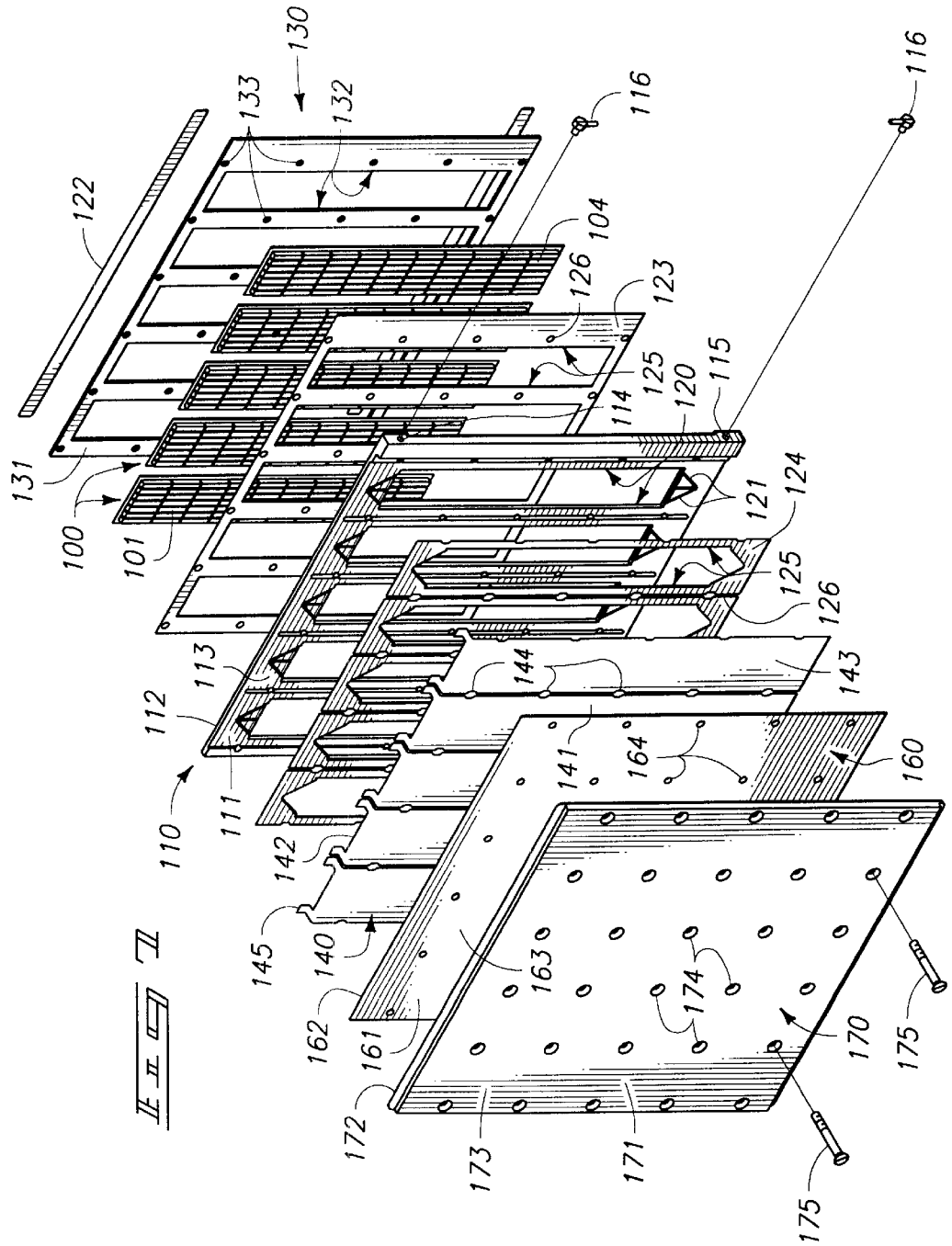
FIG. 7 is a second, perspective, partial, exploded view of a portion of the ion exchange membrane fuel cell module as seen in FIG. 1.
Figure 10:
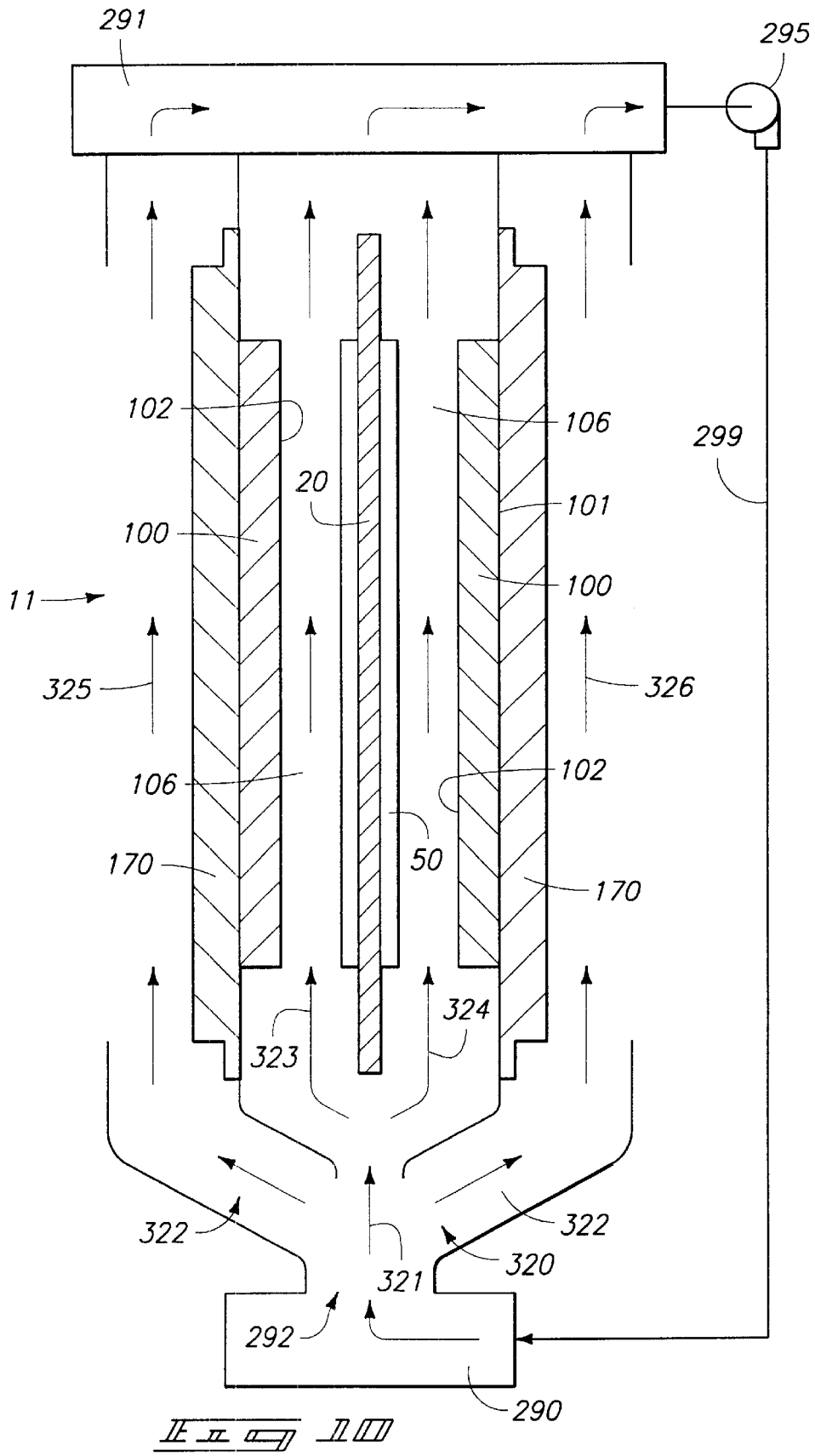
FIG. 10 is a fragmentary, schematic representation of an ion exchange membrane fuel cell module, and associated power system.

As best seen in the exploded view of FIGS. 4 and 7, the ion exchange membrane fuel cell module 11 includes a plurality of membrane electrode diffusion assemblies generally indicated by the numeral 100. Each of the membrane electrode diffusion assemblies have an anode side 101, and an opposite cathode side 102. Still further, each of the membrane electrode diffusion assemblies is defined by a peripheral edge 103, and further has formed in its anode side, a plurality of interlinking channels 104. The membrane electrode diffusion assembly 100, as noted above, is formed of a solid ion conducting membrane 105 which is sealably mounted or received in each of the respective cavities 34. In this arrangement, the cathode side A 102 of each membrane electrode diffusion assembly 100 is held in spaced relation relative to the support member 20 by deformable electrically conductive members 70 (FIGS. 2 and 3) of the cathode current collector 60. This spacial arrangement, which is provided by the cathode current collector, facilitates, in part heat dissipation from the fuel cell module 11. As described, above, the membrane electrode diffusion assembly 100; associated cathode current collector 60; and support member 20 in combination, define a cathode air passageway 106 therebetween (FIG. 10). The construction of a suitable membrane electrode diffusion assembly was described in our earlier U.S. Pat. No. 6,030,718. This earlier patent is incorporated by reference herein, and further discussion regarding the construction of the membrane electrode diffusion assembly is not undertaken herein.

As will be appreciated, from a study of FIG. 10, the cathode air passageway 106 is defined or otherwise oriented on each side 26 of the support member 20. Therefore, the fuel cell module 11 has a bifurcated cathode air flow. As will be appreciated, while the earlier described membrane electrode diffusion assembly was directed to a proton exchange membrane, the fuel cell power system 10 is not limited solely to a type having proton exchange membranes, but also may utilize anion exchange membranes.

Figure 5:
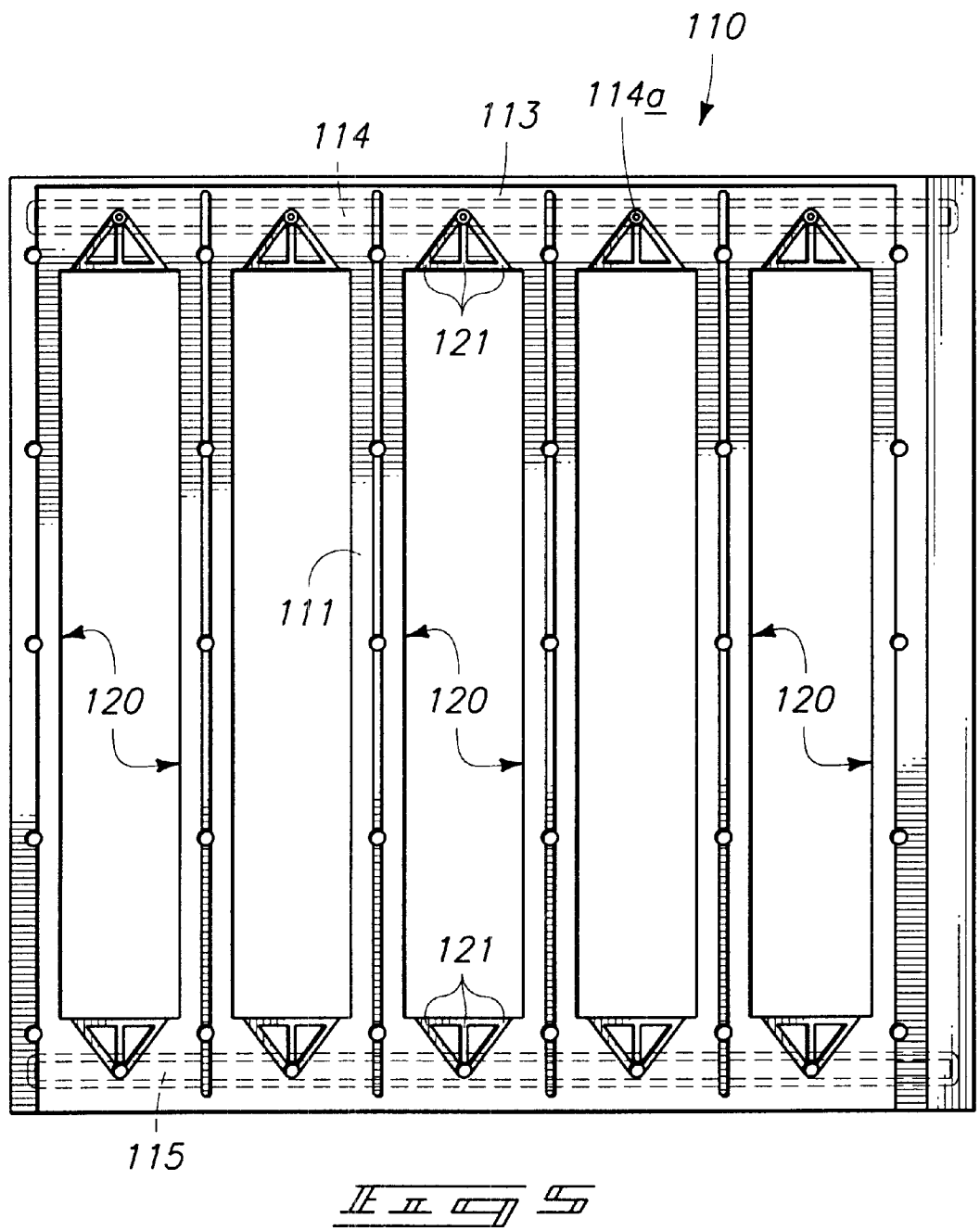
FIG. 5 is a fragmentary, side elevational view of a fuel distribution assembly utilized with the ion exchange membrane fuel cell module as seen in FIG. 1.
Figure 6:
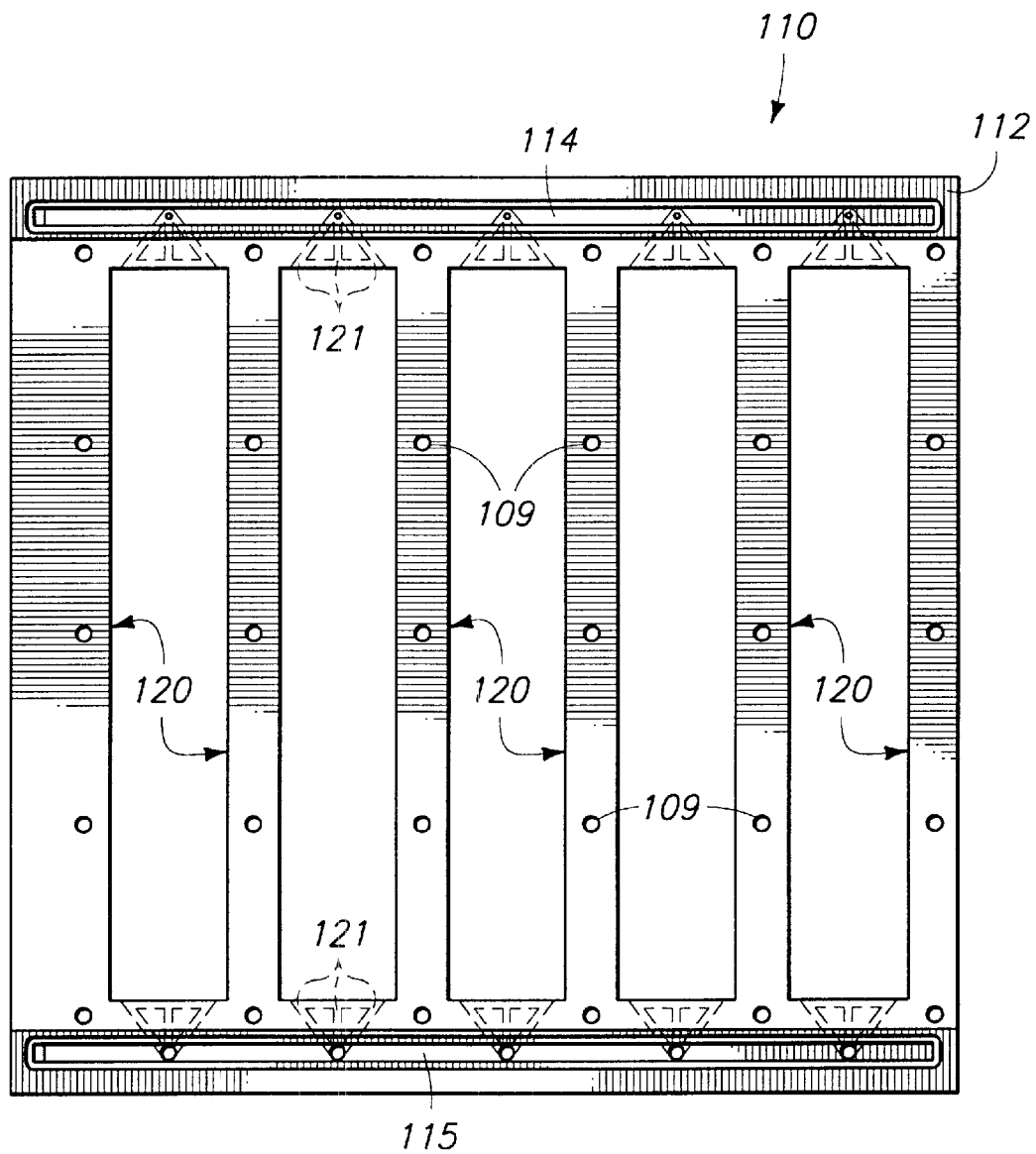
FIG. 6 is a second, fragmentary, side elevational view of the fuel distribution assembly taken from a position opposite to that seen in FIG. 5.

As best seen by reference to FIGS. 5, 6 and 7, a fuel distribution assembly, which is generally indicated by the numeral 110, is coupled in fluid flowing relation relative to the anode side 101 of each of the membrane electrode diffusion assemblies 100. Each fuel distribution assembly 110 is coupled with a source of a fuel 340 (FIG. 8) which may be substantially pure, or which is diluted to various degrees. Such may be achieved if the fuel cell power system was coupled with a fuel processor which would produce a stream of hydrogen from a source of hydrocarbon fuel such as gasoline, natural gas, propane, etc. If the fuel cell power system 10 was fabricated in the nature of a proton exchange membrane fuel cell, the dilute fuel supply would include hydrogen. The concentration of the hydrogen in the dilute fuel would normally be in a range of about 30% to about 80% by volume.

When supplied with this dilute fuel mixture (regardless of the type), the fuel cell modules 11 produce an average current density of at least about 350 mA per square centimeter of surface area of each anode side 101 at a nominal voltage of 0.5 volts. Further, the interlinking channels 104 formed in the surface of the anode side 101 facilitate the distribution of the dilute fuel substantially about the entire surface area of the anode side 101. In this arrangement, if contaminants are introduced byway of the dilute fuel mixture or other blockage occurs, the interlinking channels 104 provide a convenient passage by which the fuel may reach substantially the entire surface area of the anode side 101, even though some portions of the interlinking channels 104 may be blocked or otherwise substantially occluded. As noted above, the dilute fuel 340 may be supplied by a fuel processor 342 (FIG. 8) which receives a hydrocarbon based fuel, and then through a chemical reaction fractionates the hydrocarbon fuel source to liberate a dilute stream of hydrogen which is mixed with other substances. In the alternative, the fuel may be supplied by a pressurized container 341. These alternative arrangements are shown in FIG. 8.

As best seen by reference to the exploded view as shown in FIG. 7 and FIG. 1, the ion exchange membrane fuel cell module of the present invention includes a pair of the fuel distribution assemblies 110 which are individually mounted in fluid flowing relation relative to the anode side 101 of the respective membrane electrode diffusion assemblies 100.

As best seen in FIGS. 5 and 6, each of the fuel distribution assemblies 110 include a main body 111 which has an inside facing surface 112, (FIG. 6) and an outside facing surface 113 (FIG. 5). The main body 111 further defines an intake plenum 114, and an exhaust plenum 115. Further, a fluid coupling 116 (FIG. 1) is mounted in fluid flowing relation relative to the individual intake and exhaust plenums 114 and 115 respectively. A reduced dimension orifice 114*a* (FIG. 5) is formed in the main body and communicates with the intake plenum 114. This reduced diameter orifice operates to create a pressure differential in the respective apertures or cavities 120 during certain operational conditions to facilitate the clearance of contaminants or other obstructions which may be blocking any of the channels 104 which are formed in the membrane electrode diffusion assembly 100. A plurality of cavities or apertures 120 are formed in the main body 111, and extend between the inside and outside facing surfaces 112 and 113 respectively. The cavities or apertures 120 are disposed in spaced relation, one to the other, and when assembled, the cavities 120 receive the individual membrane electrode diffusion assemblies 100. As best seen in FIG. 5, a plurality of channels or passageways 121 are formed in the main body 111, and couple the individual cavities 120 in fluid flowing relation with the respective intake and exhaust plenums 114 and 115.

Additionally, a plurality of fastener apertures 109 are formed in the main body. As further seen in FIG. 7, a sealing member 122 lies in covering relation relative to the individual channels 121.

As best seen in FIG. 1, a plurality of conduits 150 couple in fluid flowing relation the fuel coupling 40 with the fuel distribution assembly 110. Two of the conduits designated as 151 allow a dilute fuel mixture to be delivered by way of the intake plenum 114 to the individual membrane electrode diffusion assemblies 100. Thereafter, any remaining fuel, and associated by-products of the chemical reaction are received back into the exhaust plenum 115 and then flow by way of conduits 152 to the fuel coupling 40 and then to the exhaust passageway 44.

First and second pressure sensitive adhesive seals 123 and 124 (FIG. 7), respectively are provided, and are disposed in juxtaposed relation relative to the opposite inside and outside facing surfaces 112 and 113 respectively. Each of the seals 123 and 124 have apertures 125 formed therein which are substantially coaxially oriented relative to the respective cavities 120. As will be recognized, the cavities 120 which are formed in the main body 111 of the fuel distribution assembly 110, matingly cooperate and are substantially coaxially aligned with the individual cavities 34 which are formed in the nonconductive support plate 20. As will be recognized and following the assembly of same, the respective membrane electrode diffusion assemblies 100 are individually received in mating relation in each of the cavities 120 and 34 which are defined by both the fuel distribution assembly 110, and the support member 20. Further, a plurality of fastener apertures 126 are formed in the individual seals 123, and 124, and are operable to receive fasteners which will be discussed in greater detail hereinafter.

Lying in immediate juxtaposed relation relative to the second pressure sensitive adhesive seal 124 is an anode current collector which is generally designated by the numeral 140. Additionally, and as seen in FIG. 7, a substantially rigid sealing plate 130 is provided and which is juxtaposed relative to the cathode side 102 of the membrane diffusion assembly 100. The sealing plate 130 has a main body 131 which defines a plurality of apertures 132 which matingly receive, in part, the respective membrane electrode diffusion assemblies 100. Still further, the main body has a plurality of fastener apertures 133 formed therein and which when assembled, are substantially coaxially aligned with the aforementioned fastener apertures formed in the earlier described portions of the fuel cell module 11.

Each anode current collector 140 lies in ohmic electrical contact against the anode side 101 of each of the membrane electrode diffusion assemblies 100 and further is oriented in heat receiving relation relative thereto. The anode current collector 140 has an electrically conductive main body 141 which has an inside facing surface 142 which lies against the anode side 101 of the membrane electrode diffusion assembly 100, and an opposite outside facing surface 143. Still further, a plurality of fastener apertures 144 are formed in the main body 131 and are operable to be substantially coaxially aligned relative to the other fastener apertures 126 formed in the various seals 123, 124, and in the fuel distribution assembly 110.

As seen in FIG. 7, an electrically insulative member or gasket 160 is mounted or oriented in juxtaposed relation relative to the outside facing surface 143 of the anode current collector 140. This insulative member has a main body 161 which has an inside facing surface 162 which rests in contact with the outside facing surface 143 of the anode current collector, and further has an outside facing surface 163. Further, a plurality of fastener apertures 164 are operable to be coaxially aligned with the previously described fastener apertures formed in the remaining parts of the ion exchange membrane fuel cell power system 10.

As best seen in FIG. 7, an anode heat sink 170 is oriented in juxtaposed relation relative to the insulative member 160, and further, is mounted in heat receiving relation relative to the anode sides 101 of each of the membrane electrode diffusion assemblies 100 to conduct heat energy generated by the ion exchange membrane module 11 away from the membrane electrode diffusion assembly 100. In this arrangement, the fuel distribution assembly 110 is located substantially between the anode side 101 of the membrane electrode diffusion assembly 100, and the anode current collector 140. The anode heat sink 170 has a main body 171 which has an inside facing surface 172, which lies in juxtaposed relation relative to the insulative member 160, and an opposite outside facing surface 173. Similarly, and as discussed above, numerous fastener apertures 174 are formed therein, and which are substantially coaxially aligned with the remaining fastener apertures which are formed in the earlier disclosed portions of the ion exchange membrane fuel cell module 11. Fasteners 175 are provided and are received in these coaxially aligned fastener apertures such that the module is held firmly together. These fasteners 175 along with the respective current collectors 60 create sufficient pressure to allow the individual current collectors 60 and 140 to make effective ohmic electrical contact with the anode and cathode sides 101 and 102, respectively, of the membrane electrode diffusion assembly 100. As will be recognized from the discussion above, the anode current collector 140 is substantially electrically isolated from the anode heat sink 170. Additionally, the anode heat sink has sufficient thermal conductivity such that it substantially inhibits the formation of a temperature gradient across the membrane electrode diffusion assembly 100 during operation of the ion exchange membrane fuel cell power system 10.

A handle assembly is generally indicated by the numeral 190 and is best seen in FIG. 2. As shown therein, the handle assembly 190 has a back plate generally indicated by the numeral 191, and which is defined by a front surface 192, and an opposite rear surface 193. Formed through the front and rear surfaces is an aperture 194 which matingly receives the member 84 which is mounted on the main body 81 of the current conductor assembly 80. Still further, a pair of handles 195 are fastened on the front surface 192, and additionally, a plurality of fastening apertures 196 are formed through the front and rear surfaces 192 and 193 and are operable to receive fasteners 197 which threadably engage the fastener apertures 31, which are formed in the forward edge 23 of the support member 20. The handles permit the module 11 to be easily manipulated by hand, and removed without the use of any tools, when utilized with a subrack or sub-system which will be discussed in greater detail hereinafter.

Figure 9:
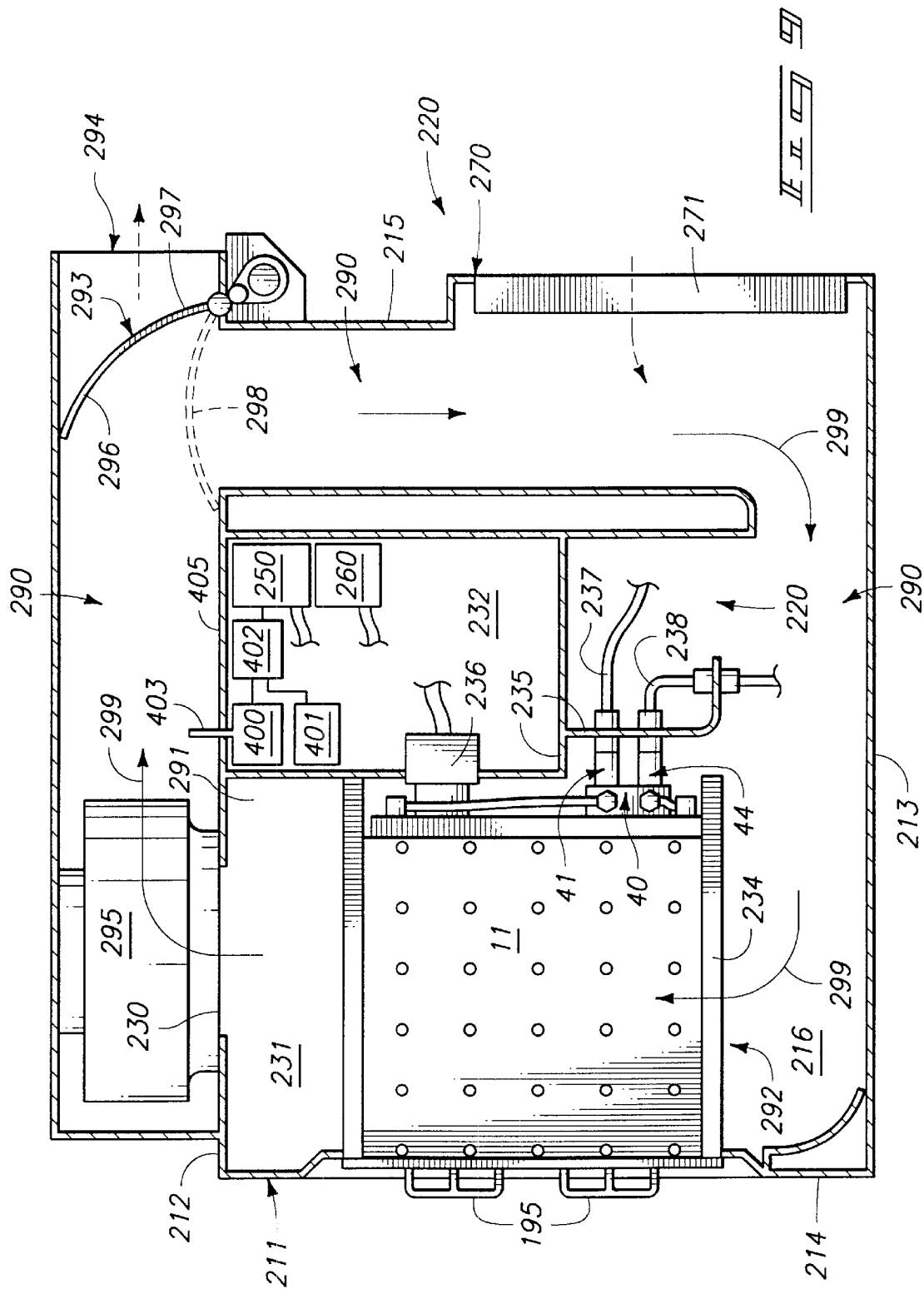
FIG. 9 is a fragmentary, transverse, vertical sectional view taken from a position along line 9—9 of FIG. 8.

The ion exchange membrane fuel cell module 11 is employed in combination with a plurality of subracks or sub-systems 210, one of which is shown in FIGS. 8 and 9 and which is generally indicated by the numeral 210. Each subrack 210 releasably supports a plurality of ion exchange membrane fuel cell modules 11 in an operable arrangement. Each subrack 210 includes a principal enclosure 211. The principal enclosure is defined by a top surface 212; bottom surface 213; front sidewall 214; rear sidewall 215; left sidewall 216, and right sidewall 217. The respective sidewalls 212 through 217 define an internal cavity 220 (FIG. 9). In this arrangement, the principal enclosure will receive multiple fuel cell modules 11, each enclosing a membrane electrode diffusion assembly 100.

As seen in FIG. 8, the ion exchange membrane fuel cell power system is configured in a manner where at least one of the fuel cell modules 11 can be easily removed from at least one of the subracks 210 by hand, while the remaining modules continue to operate. As noted above this removal is normally accomplished without the use of any tools, however it may be necessary in some commercial or industrial applications where vibration, and other outside physical forces may be imparted to the system, to use threaded fasteners and the like to releasably secure the individual modules to the subrack 210 to prevent the unintentional displacement or dislocation of the respective modules from the subrack 210. If utilized, the hand tools which will be employed will be simple hand tools, and the removal will be accomplished in minutes, as opposed the prior art stack arrangements where replacement of a damaged membrane electrode assembly (MEA) may take hours to accomplish. It should be understood that the terms "subrack" and "subsystem" as used in the following claims do not necessarily imply that a rack or shelf is required, only that the subsystem, or a portion thereof, is operable independently whether or not other sub-system, or a portion thereof, of the fuel cell power system 10 are functioning.

As best seen by reference to FIG. 9, an aperture 230 is formed in the top surface 12 of the subrack 210, and further, the cavity 220 is comprised of a first or fuel cell module cavity 231, and a second cavity or electrical control bay 232. As best seen by reference to FIG. 8, a plurality of individual module apertures 233 are formed in the front surface 214 of the principal housing 211, and are operable to individually receive the respective fuel cell modules 11, and position them in predetermined spaced relation, one to the other.

The fuel cell module cavity 231 is further defined by a supporting member or shelf 234 (FIG. 9) which orients the individual fuel cell modules 11 in a predetermined substantially upright orientation within the cavity 231. Additionally, the fuel cell module cavity 231 is defined by a rear wall 235 which supports a DC bus 236 in an orientation which will allow it to releasably, matingly, electrically couple with the current conductor assembly 80 (FIG. 2) which is borne by the fuel cell module 11. Yet further, and as seen in the cross sectional view of FIG. 9, the rear wall 235 further supports a fuel supply line 237 and a byproduct removal line 238. These are operable to be releasably coupled in fluid flowing relation with respect to the fuel delivery passageway 41 and the exhaust passageway 44 of the fuel coupling 40.

As best seen in FIG. 9, the second cavity or electrical control bay 232 encloses a digital or analog controller 250 which is electrically coupled with the respective ion exchange membrane fuel cell modules 11, and a power conditioning assembly 260 which is electrically coupled with the DC bus 236, and the controller 250, and which is operable to receive the electrical power produced by the ion exchange membrane fuel cell modules 11. The operation of the controller 250 and power conditioning assembly 260 and related control circuitry is discussed in prior U.S. application Ser. Nos. 09/108,667 and 09/322,666, which are incorporated by reference herein.

As further seen in FIG. 9, an aperture 270 is formed in the rear wall 215 of the principal enclosure 211, and is operable to receive an air filter 271 which is operable to remove particulate matter from an outside ambient air stream passing therethrough and into the principal enclosure 211.

As best seen by the cross sectional view in FIG. 9, the subrack 210 includes an air distribution plenum 290 which is coupled in fluid flowing relation relative to each of the ion exchange membrane fuel cell modules 11. The air distribution plenum 290 has a first or intake end 291 which receives both air which has previously come into contact with each of the ion exchange fuel cell modules 11, and air which comes from outside of the respective ion exchange membrane fuel cell modules. Further, the air distribution plenum has a second or exhaust end 292 which delivers an air stream to each of the ion exchange fuel cell modules 11. Disposed intermediate the first or intake end 291, and the second or exhaust end 292 is an air mixing valve 293 which is coupled to the air distribution plenum 290, and which meters the amount of air which is passed through the respective ion exchange membrane fuel cell modules 11 and is recirculated back to the ion exchange fuel cell membrane modules and by way of the air filter 271. As illustrated, the mixing valve 293 selectively occludes an aperture 294 which is formed in the rear wall 215 of the subrack 210.

An air movement assembly such as a fan 295 is provided and is mounted along the air distribution plenum 290. As shown in FIG. 9, the air movement assembly 295 is positioned near the intake end 291, and is substantially coaxially aligned with the aperture 230 which is formed in the top surface 212 of the subrack 210. The air mixing valve and the fan assembly 293 and 295 respectively are electrically coupled with the controller 250 and are controlled thereby. The air mixing valve 293 comprises a pivotally movable valve member 296 which can be moved from a first occluding position 297 relative to the aperture 294, and a second, substantially non-occluding position 298 as shown in phantom lines.

As will be recognized, when the valve member 296 is in the second non-occluding position, air received in the intake end 291 and which has previously passed through the individual fuel cell modules will pass out of the principal enclosure 211 and then be exhausted to the ambient environment. On the other hand, when the valve member 296 is in the occluding position 297 air from the intake end 291 which has passed through the fuel cell module 11 will return to the exhaust end and then pass through the modules 11 and return again to the intake end. As will be recognized, by controlling the relative position of the valve member 296, temperature as well as relative humidity of air stream 299 can be easily controlled. Still further, in the occluding position 297, air from the ambient will continue to enter the air distribution plenum by way of the air filter 270.

More specifically, the air stream 299 which is supplied to the fuel cell modules is provided in an amount of at least about 5 to about 1000 times the volume required to support a fuel cell chemical relation which produces water vapor as a byproduct. The present air plenum arrangement provides a convenient way by which the air stream delivered to the cathode side 102 can be humidified by the water vapor generated as a byproduct of the chemical reaction taking place on the cathode. Additionally, during cold operating conditions, this same air, which has now been heated by each of the fuel cell modules 11, will contribute to bringing the entire fuel cell up to normal operating temperatures. Further, the air mixing valve 293 limits the amount of air which has previously passed through the modules 11 and which is added to the air distribution plenum 290. This resulting recirculated air stream and fresh ambient air forms an air stream having substantially optimal operating characteristics which maximizes the current densities and outputs of the respective membrane electrode diffusion assemblies enclosed within each of the fuel cell modules 11.

Referring now to FIG. 10, what is shown is a greatly simplified, exaggerated, partial, and cross-sectional view of an ion exchange membrane fuel cell module 11 positioned in an operational relationship relative to the air distribution plenum 290. This particular sectional view, which does not include many of the subassemblies previously discussed, is provided t o illustrate the principals that will be set forth below. As seen in FIGS. 9 and 10, and as discussed above, the subrack 210 includes an air distribution plenum 290 which provides a stream of air 299 to each of the ion exchange fuel cell modules 11 which are received in an operational position on the shelf or supporting member 234. The air stream 299 exits from the exhaust end 292 and then becomes a bifurcated air flow which is generally indicated by the numeral 320. The bifurcated air flow 322 comprises a first cathode air stream 321, which is received in the respective ion exchange membrane fuel cell modules 11; an d a second anode heat sink air stream which is generally indicated by the numeral 322. As will be recognized by a study of FIG. 10, the first cathode air stream 321 enters the ion exchange membrane fuel cell module 11, and is further bifurcated into a first component 323 which moves along one of the cathode air passageways 106 which is defined on one side of the support member 20. Further, the first cathode air stream 321 has a second component 324 which passes along the cathode air passageway 106 on the opposite side of the support member 20. As will be appreciated, the bifurcated cathode air stream 321 provides the necessary oxidant (oxygen in the ambient air stream) to the cathode side 102 of the membrane electrode diffusion assembly 100. Yet further, the cathode air flow operates to remove less than a preponderance of the heat energy generated by the membrane electrode diffusion assembly 100 while it is in operation. As will be recognized the cathode air flow is facilitated by the respective cathode current collectors 60 which create in part, the cathode air passageway 106.

The anode heat sink air stream 322 is further bifurcated into a first component 325 and a second component 326, both of which individually move along the opposite sides 16 of the ion exchange membrane fuel cell module 11, and over each of the anode heat sinks 170. As the anode heat sink air stream components 325 and 326 move over the opposite anode heat sinks 170, the anode heat sink air stream operates to remove a preponderance of the heat energy generated by the ion exchange membrane fuel cell module 11 during operation. Therefore, it will be recognized that the present invention provides an ion exchange fuel cell module 11 which has a bifurcated air flow 320 which regulates the operational temperature of the ion exchange membrane fuel cell module by removing the heat energy generated therefrom.

Referring now to FIG. 8, and as earlier discussed, the individual ion exchange membrane fuel cell modules 11 and the subrack 210 comprise in combination a fuel cell power system which is coupled in fluid flowing relation relative to a source of a substantially pure or dilute fuel generally indicated by the numeral 340. The fuel gas supply may comprise a source of bottled and compressed fuel gas generally indicated by the numeral 341, or a fuel stream which is provided by a chemical reactor, or fuel processor 342 which produces the fuel stream for use by the individual ion exchange fuel cell modules 11. A conduit 343 couples either fuel gas supply 340 with the respective ion exchange fuel cell modules 11 and the associated subrack 210. When a chemical fuel processor 342 is provided, the fuel processor would receive a suitable hydrocarbon fuel stream such as natural gas, propane, butane, and other fuel gases and would thereafter, through a chemical reaction release a fuel stream which would then be delivered by way of the conduits 343.

The present fuel cell power system 10 may also include a fuel gas recovery and recycling system (not shown) which would recover or recapture unreacted fuel gas which has previously passed through the individual ion exchange fuel cell modules 11. This system, in summary, would separate the unreacted fuel gas and would return the unreacted fuel gas back to the individual ion exchange fuel cell modules for further use. This recovery system would be coupled with the byproduct removal line 238.

Although a certain number of subracks 210 are shown in the drawings, and a certain number of fuel cell modules 11 are shown per subrack 210, it will be readily apparent that any desired number of subracks and modules 11, or a portion thereof, could be employed in alternative embodiments.

The fuel cell power system 10 (FIG. 9) includes one or more gas sensors 400 in one or more locations and which are used, for example, to detect the presence of fuel (e.g., hydrogen gas). The presence of hydrogen gas in certain areas of the fuel cell power system 10 of the subracks 210 may indicate a fuel leak. Such fuel leaks can be potentially hazardous under certain operating conditions. One such sensor 400 is shown in FIG. 9. The sensor 400 has a sampling port 403, including a sensor element, and a baffle protecting the sensor element; e.g., from high velocity airflow. The sampling port 403 is the part of the sensor primarily exposed to the target gas. In one embodiment, the baffle comprises a sintered bronze disk. Other alternatives could be employed. For example, the baffle could just as easily be a piece of chemist's filter paper. Further, if the sampling port 403 is located in an area that does not have ventilation or high airflow, the baffle is not necessary and can be omitted altogether.

The sensor 400 includes an integral heater for heating the sensor element to a predetermined operating temperature. The heater can be, for example, a wire that is spirally wound relative to the sensor element. Such heaters provide heat in a predefined temperature range to assure proper operation of the accompanying sensor. Other configurations are, of course, possible for the sensor 400. In operation, an electrical current is applied to the heater associated with the sensor 400, at a predetermined power level, to maintain the element at a specified operational temperature. For example, with one commercially available sensor, approximately 600 mW of power maintains the sensor at a temperature of 500° C.

The fuel cell power system 10 further includes circuitry 402 which is electrically coupled to the sensor 400. The circuitry 402 controls operation of the sensor 400 (e.g. generation of heat by the heater included in the sensor 400) and further is coupled to the controller 250. In one embodiment, the circuitry 402 is a printed circuit card associated with the sensor 400 and which is provided by the manufacturer thereof.

In one embodiment, for example (see FIG. 9), the gas sensor 400 is positioned such that it may sense hydrogen gas in the plenum 290. In this embodiment, the gas sensor 400 is primarily housed in the cavity or electrical control bay 232. The circuitry 402 associated with the card (discussed above) is also located in the electrical control bay 232 and is mounted, for example, on ¼-inch-long standoffs which are affixed to the top of the control bay 232. As seen in FIG. 9, the sampling port 403 protrudes through the bulkhead 405 separating the chamber 232 and the plenum 290 in order to position the sampling port 403 inside plenum 290.

Other locations for the sensor 400 are, of course, possible. The location is, in the illustrated embodiment, selected such that the sampling port 403 is positioned downstream of the fan 295. This location insures that leaking hydrogen is homogenized into the air, but is detected before encountering any mixing vanes 293, or where fresh air is introduced 271. Further, the location, in the illustrated embodiment, is selected such that the circuitry 402 and the electrical connector between the circuitry 402 and the sensor 400 are located within the control bay 232 so that this connector does not have to pierce the bulkhead 405. This also allows the electronics of the circuitry 402 to be located in an area that is cooled via fan-forced air.

Alternately, the sensor 400 may be located in the plenum 290 and the electrical connector between the circuitry 402 and the sensor 400 must then pierce the bulkhead 405. This is less desirable because the fuel cell system 10 circulates air at about 55 degrees C. and this higher temperature lessens the life of power-producing electronic components on the circuitry 402. Further, a seal is required where the cable pierces the bulkhead 405.

The fuel cell power system 10 further includes dew point determining equipment 401. In one embodiment of the invention, the dew point determining equipment comprises chilled-mirror equipment, configured to provide a signal representative of the dew point. Chilled-mirror dew point determining equipment is described, in greater detail, in the following U.S. patents which are incorporated herein by reference: U.S. Pat, No. 5,739,416 to Hoenk; U.S. Pat. No. 5,507,175 to Cooper; and U.S. Pat. No. 6,155,098 to Shapiro et al. In an alternative embodiment, the dew point determining equipment comprises a temperature sensor and a relative humidity sensor.

In the present embodiment, the circuitry 402 is coupled to the dew point determining equipment 401 as well as to the sensor 400. In this embodiment, the circuitry 402 compensates the sensor 400 for the effects of dew point. Alternatively, the compensation can be performed elsewhere, such as in the controller 250.

While other sensors could be employed, in the illustrated embodiment, the sensor 400 is a metal oxide semiconductor (MOS) hydrogen sensor, model TGS 821, and which is commercially available from Figaro Engineering (Figaro). Figaro's sensors are described in the following U.S. patents, which are incorporated herein by reference: U.S. Pat. No. 5,006,828 to Yutaka et al.; U.S. Pat. No. 4,958,513 to Yasunga et al.; U.S. Pat. No. 4,938,928 to Koda et al.; U.S. Pat. No. 4,827,154 to Naoyuki e t al.; U.S. Pat. No. 4,816,800 to Onaga et al.; U.S. Pat. No. 4,731,226 to Takahata et al.; U.S. Pat. No. 4,718,991 to Yamazoe et al.; U.S. Pat. No. 4,701,739 to Sasaki; U.S. Pat. No. 4,658,632 to Sasaki; U.S. Pat. No. 4,575,441 to Murakami et al.; U.S. Pat. No. 4,459,577 to Murakami et al.; and U.S. Pat. No. 4,117,082 to Matsuyama.

Figure 11:
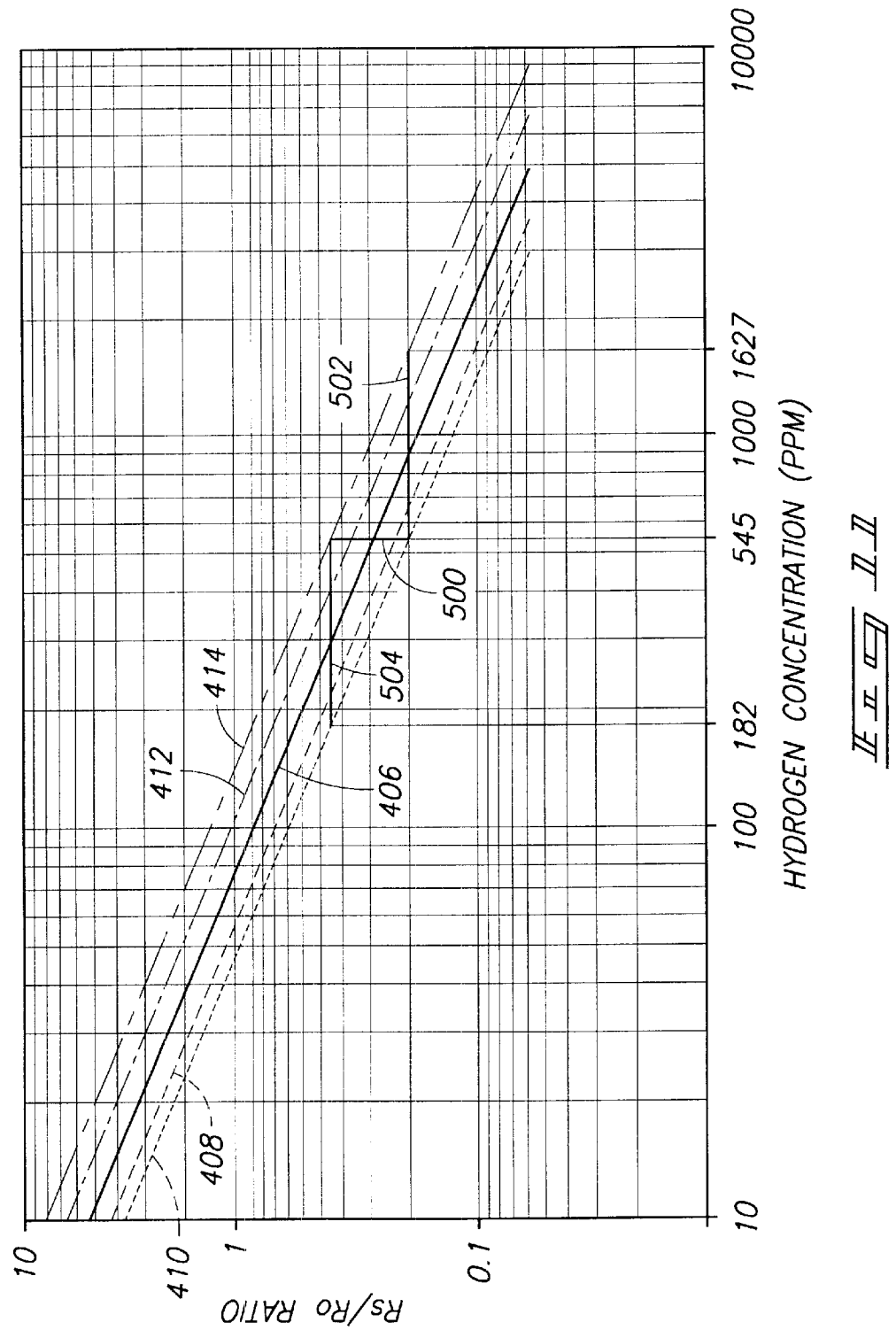
FIG. 11 is a graph illustrating the average ratiometeric response of a typical MOS gas sensor to the concentration of a gas used as a fuel in the fuel cell system as illustrated.
Figure 11:
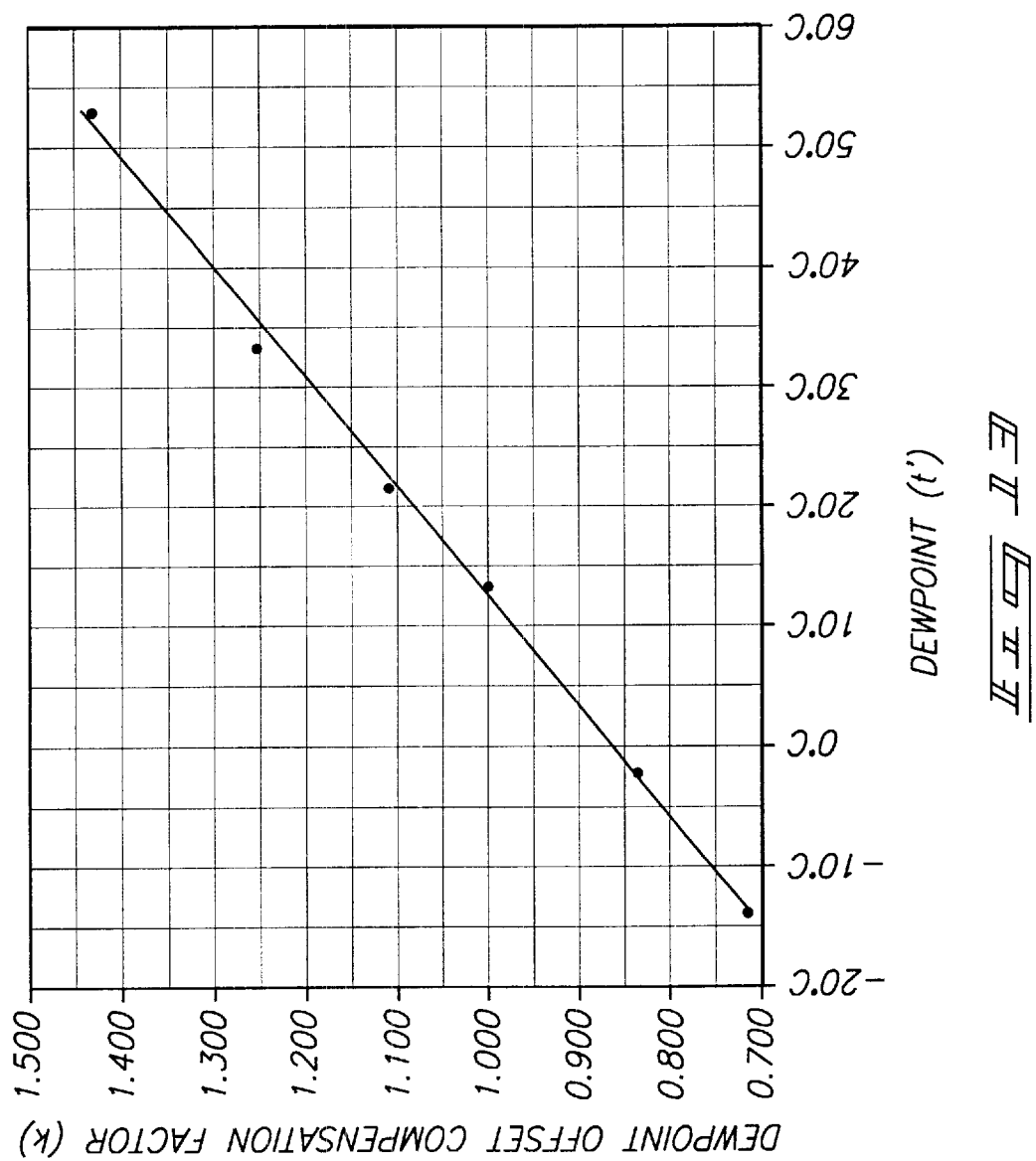
Figure 11A:
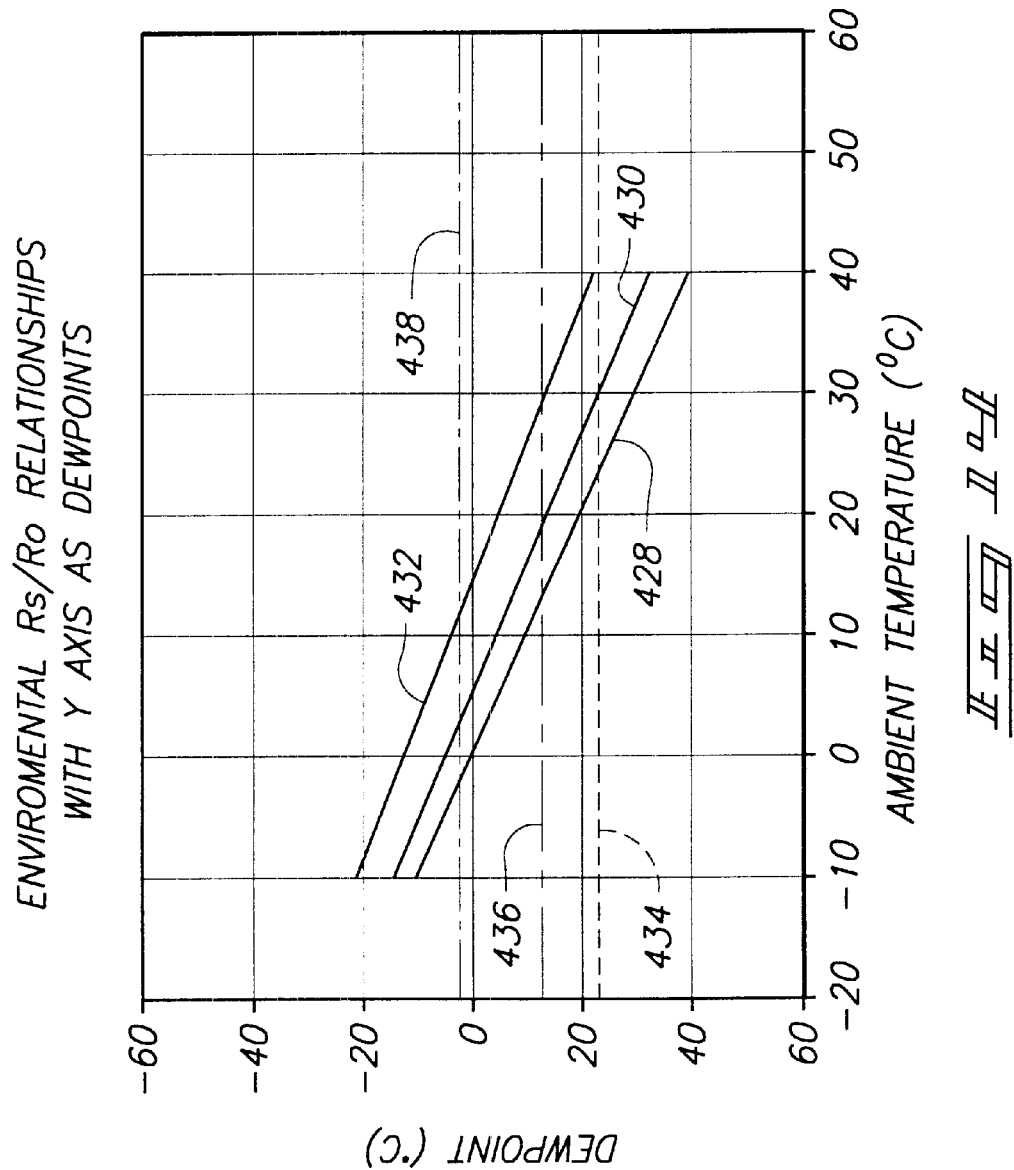

FIG. 11 illustrates temperature/humidity dependency. More particularly, FIG. 11 shows the average ratiometric response of one sensor model, the Figaro TGS821, to hydrogen and shows environmental offsets. The function is $y=10^{(a \times Log(X)+b)}$ where $a=-0.725$ and $b=1.45$. The average sensor's response is normalized to an "Rs/Ro" of unity at 100 PPM. The sensitivity of the sensor defined by the relationship between gas concentration changes and the sensor resistance changes is based on a logarithmic function. The x-axis is gas concentration and the y-axis is indicated as a sensor resistance ratio Rs/Ro where Rs is sensor resistance.

In the graph of FIG. 11, the four slopes 408, 410, 412, 414 adjacent to the main (bold) one 406 denote the extent to which temperature and relative humidity—environmental dependencies—can affect the sensor's signal output in fuel cell applications. Slope 406 is an environmental dependency Rs/Ro of unity, slope 408 is an environmental dependency Rs/Ro of 0.8, slope 410 is an environmental dependency Rs/Ro of 0.6835, slope 412 is an environmental dependency Rs/Ro of 1.25, and slope 414 is an environmental dependency Rs/Ro of 1.5109. At an environmental dependency Rs/Ro of unity, the average sensor of this model has about 3.2 kΩ of resistance at 100 PPM but can range between 1 and 10 k Ω. This uncertainty in the offset value in the sensor's sensitivity response is represented by the value "b" in the function $y=10^{(a \times Log(X)+b)}$ and means that whereas the average value for "b" is 1.45 for this particular sensor, it can actually range from 0.95 to 1.95 for those sensors whose "a" values are −0.725. The value "a" in this formula describes this particular sensor's sensitivity slope (how steep it is) and is referred to as the sensor's alpha ($\alpha$). Whereas $\alpha$ averages −0.725, it can range from −0.6 to −1.2.

Note the error bar 500 on FIG. 11. Without circuitry to compensate for the environmental effects fuel cells are subject to or knowledge of the environmental circumstances, a reported reading of 545 PPM could reside anywhere on the line segment 502 projecting to the right from the bottom of the error bar (at an Rs/Ro ratio of 0.200) and the true concentration could be as great as 1627 PPM. Just as easily, a reported reading of 545 PPM could reside anywhere on the line segment 504 projecting to the left from the top of the error bar (at an Rs/Ro ratio of 0.442) and the true concentration could be as little as 182 PPM. This is an 8.9:1 range of uncertainty and is the source of much frustration with uncompensated MOS gas sensors. It may also be advantageous to have circuitry associated with a sensor, such as circuitry 402 in the present embodiment, be of an all-analog design (i.e., a design with no microprocessor at the heart of the device continually running firmware or software) in certain embodiments. It should be appreciated that in certain safety-critical applications, it can be very challenging to design both fail-safe microprocessor-based hardware and fail-safe firmware. Yet further it can be even more challenging—and costly—to prove to nationally recognized testing laboratories that such a system is fail-safe under all operating circumstances.

FIG. 12 provides an indication of the conventional way manufacturers of MOS gas sensors look at the effects of temperature and relative humidity. The solid lines 416, 418, and 420 are relative humidities of 95%, 65%, and 35% respectively. FIG. 12 illustrates the conventional view that MOS sensors' Rs/Ro ratios (environmental dependencies) along the y-axis are functions of an infinite number of combinations of relative humidities and ambient temperatures. Therefore, the conventional approach to compensating for environmental dependencies is to use a microprocessor and digital lookup charts to compensate separately for these influences. Besides the disadvantage of basing a critical safety system on a microprocessor and firmware, this method is only an approximation—particularly at lower temperatures and relative humidities.

Experiments conducted by the inventor have led him to discover that the effects of temperature and relative humidity on metal oxide semiconductor MOS gas sensors can be reduced to the single variable of dew point. In this regard it has also been found that dew point compensation is applicable to sensors other than hydrogen sensors. Dew points are consistent at each Rs/Ro ratio for various types of sensors.

Thus, though FIG. 9 shows the use of hydrogen sensors, the present invention has application to other types of sensors which may or may not be used in a fuel cell embodiment to detect the presence of hydrogen or another fuel gas.

The environmental uncertainties shown in FIG. 12 are caused by variations in the air's water content as will later be shown in connection with FIGS. 13–15. Manufacturer data includes multiple distinct slopes 416, 418, and 420 of interacting temperatures and relative humidities. Line 416 indicates temperature/humidity dependency at 95 percent relative humidity, line 418 indicates temperature/humidity dependency at 65 percent relative humidity, and line 420 indicates temperature/humidity dependency at 35 percent relative humidity for a particular model sensor, namely the Figaro 821. The FIG. 12 data indicates the sensor's dependencies to temperature and relative humidity according to the manufacturer of same.

FIG. 13 takes the average dew points found at various Rs/Ro values from manufacturer-supplied data of FIG. 12 and plots them against the reciprocal of the Rs/Ro values. As can be seen from FIG. 13, a simple linear function produces an excellent fit to the data points. As seen, the reciprocal of the Rs/Ro values were plotted. If a certain dew point produces an environmental Rs/Ro value of 0.800, an appropriate compensation factor (k) for this model of sensor would be 1.25 (1/0.8).

Referring back to FIG. 12, the dashed lines 422, 424, and 426 in FIG. 12 are of fixed relative humidity, but they relate dew point (y-axis) to temperature (x-axis). Dashed lines in FIG. 12 are supplied by applicant, not by the manufacturer of the previously mentioned sensors. The close relationship of these dashed lines to the manufacturer supplied lines 416, 418, and 420, that separately consider temperature and relative humidity, can be seen in FIG. 12.

FIG. 14 is a variation of the graph shown in FIG. 12. In FIG. 14, the Rs/Ro ratios on the Y-axis have been rep laced with dew points. Slope 428 represents a relative humidity of 95 percent, slope 430 represents a relative humidity of 65 percent, and slope 432 represents a relative humidity of 35 percent. For reference, three of the manufacturers Rs/Ro ratios—0.9, 1.0, and 1.2—are superimposed over the data. Line 434 represents a Rs/Ro ratio of 0.9, line 436 represents a Rs/Ro of 1.0, and line 438 represents a Rs/Ro of 1.2.

Figure 15:
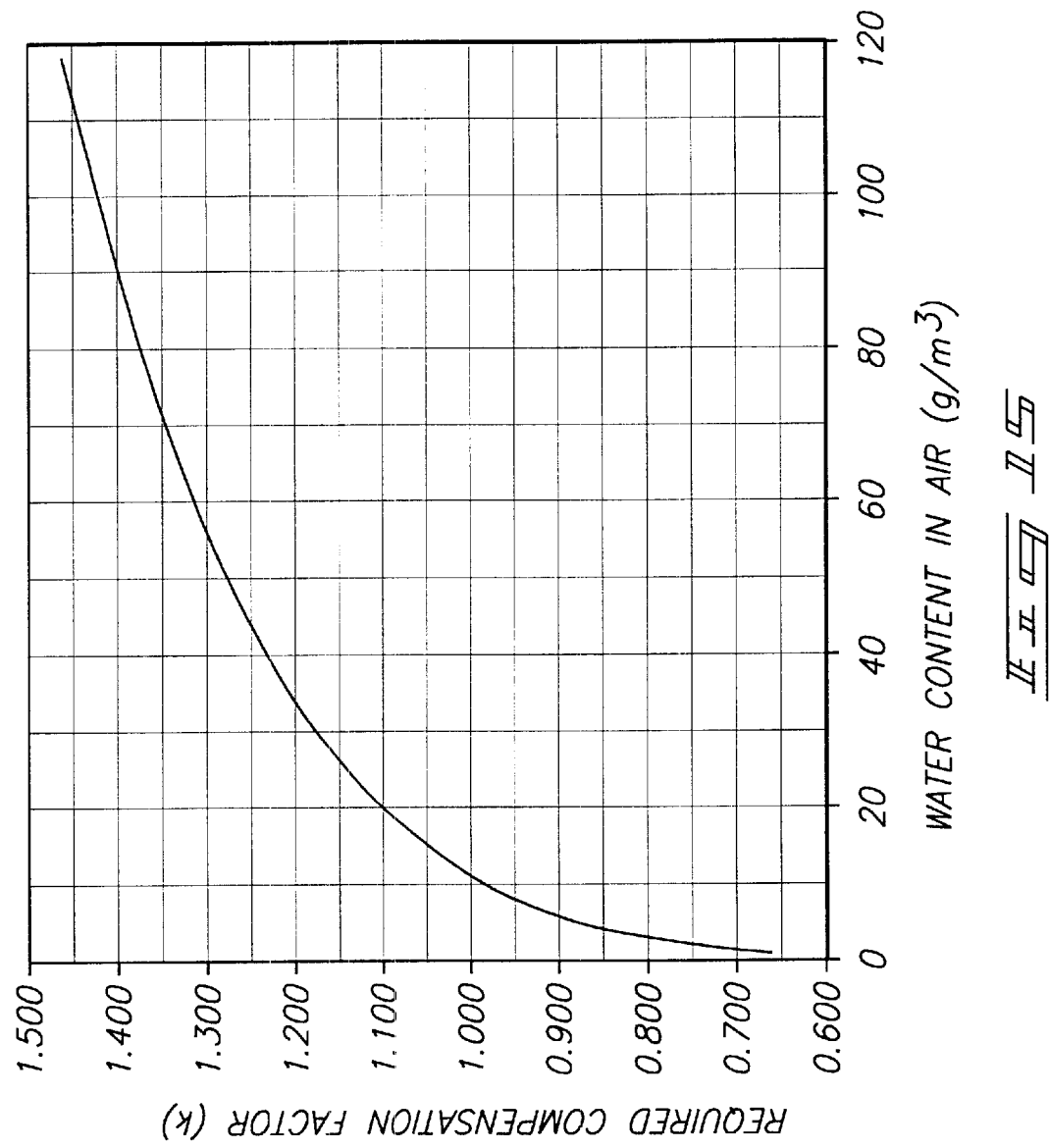
FIG. 15 is a graph illustrating the relationship of compensation factors vs. water content for the same MOS gas sensor.

FIG. 15 shows the relationship of compensation factor vs. mass content of water in air, the industry's metric. When the industry calculates compensation factors, it measures water content in terms of grams per cubic meter. This obscures the relationship between Rs/Ro environmental dependencies and dew point because the relationship to g/m3 produces a nearly straight line only when viewed on a log/linear graph. As shown in FIGS. 13–14, measuring water content in terms of dew point is a much more straightforward endeavor.

Therefore, in operation, a method of compensating MOS gas sensor 400 comprises using MOS gas sensor 400 to provide a signal indicative of gas concentration of a target gas (e.g., hydrogen) in an ambient (e.g., in the plenum 290); providing a signal representative of dew point of the ambient; and modifying the signal from the MOS gas sensor 400 using the signal representative of dew point to simultaneously compensate for the effects of both temperature and relative humidity. The signal from the gas sensor 400 is modified by the conditioning circuitry 42. In one embodiment, the circuitry 402 comprises analog circuitry. The signal from the gas sensor is modified by the circuitry 402 using the signal representative of dew point by transforming the dew point signal into a linear or semi-linear compensation factor and multiplying that compensation factor by the output of the sensor 400 (see FIG. 16). For one model sensor, the Figaro TGS821 hydrogen sensor, the best fit for sensors with an average α of −0.725 is a simple y=ax+b linear transformation, which is performed as follows: k=($A_k$×t')+$B_k$, where k is the dew point compensation factor (0.6619≦k≦1.463); t' is dew point in ° C., $A_k$=0.0109, and $B_k$=0.86352. k is a compensation factor between 0.6619 (−18.5° C. dew point) and 1.463 (55° C. dew point). This range of compensation factors will compensate for environmental Rs/Ro values ranging from 1.511 (the reciprocal of 0.6619) through 0.6835 which is the lowest expected value for the fuel cell system 10 of the illustrated embodiment.

In the preferred embodiment, the above-described $A_k$ and $B_k$ coefficients are fixed constants of 0.0109 and 0.86352 respectively and the signal representing the response slope of the sensor (which can range from −0.6 to −1.2) is normalized during calibration to an a of −0.725 before being compensated for the effects of dew point. This is because the magnitude of required change in a particular sensor's signal due to dew point is proportional to the magnitude of its response to hydrogen.

In alternative embodiments, the sensor's a need not be normalized to −0.725 during calibration and its response signal may be directly acted on by the dew point compensating circuitry. In one such embodiment, the coefficients Ak and Bk are not constants and are instead variables that are direct functions of alpha. Alternatively, improved accuracy across the full range of α can be achieved by converting t' into k using a second-order polynomial transformation where the three coefficients Ak, Bk and Ck are variables that are direct functions of alpha. Other alternatives are, of course, possible.

Thus, the circuitry 402 includes (see FIG. 16) an amplifier 440 which, in operation, multiplies t' by $A_k$, a summing amplifier or adder 442 which, in operation, adds that product to $B_k$ to produce the dew point compensation factor k, and a multiplier 444 which, in operation, multiplies the dew point compensation factor k by the output of the sensor 400. In one alternative embodiment, the functionality of the circuitry 402 is implemented in digital circuitry instead of the illustrated analog circuitry. In another alternative embodiment, the functionality of the circuitry 402 is implemented in the controller 250.

Figure 17:
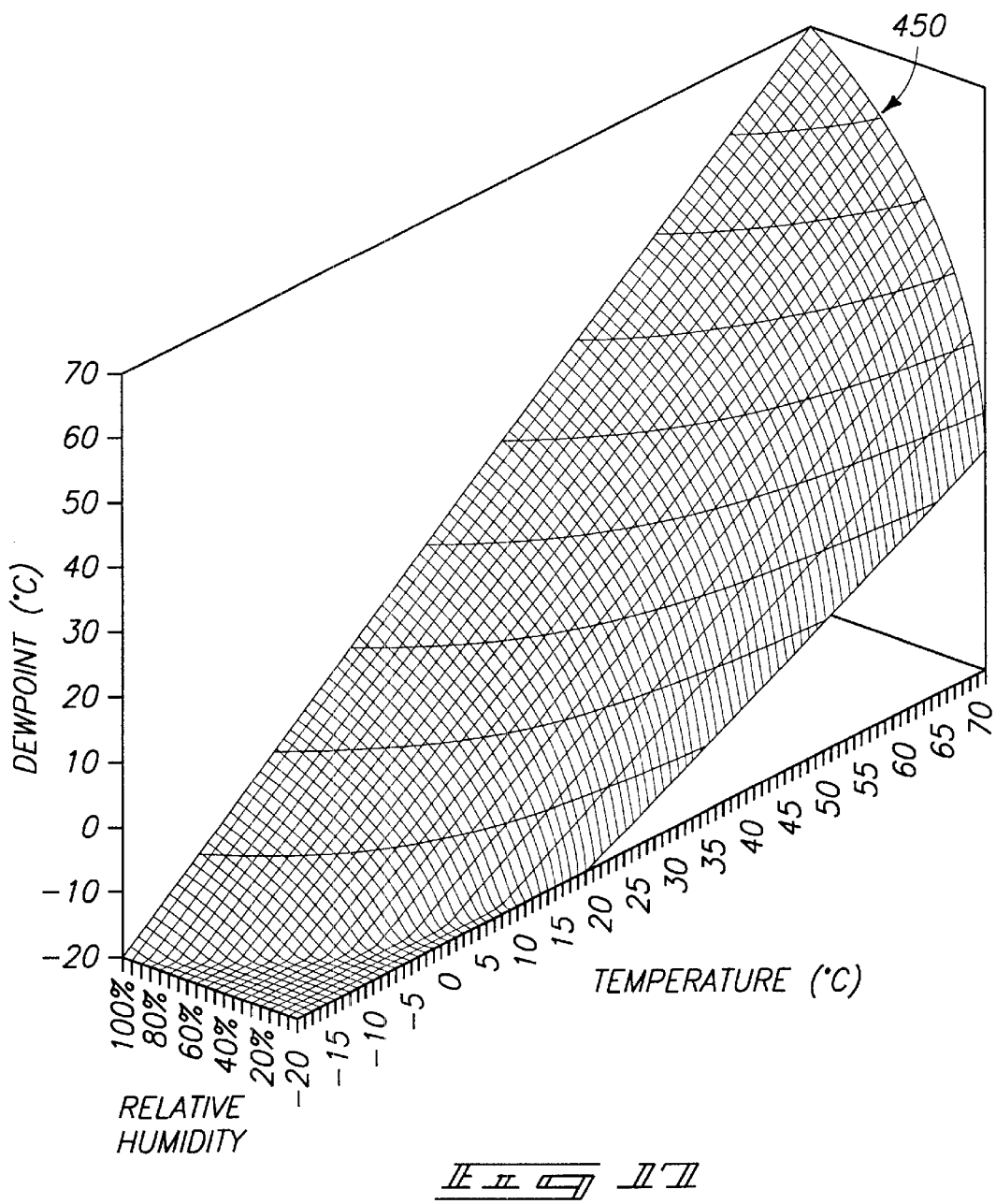
FIG. 17 is a graph illustrating the relationship of temperature and relative humidity to dewpoint.

FIG. 17 illustrates a dew point "sail" 450. Note how the sail intersects the floor of the graph and how the shape of this intersection forms a curve. This curve describes the relationship between relative humidity and temperature at a dew point of −20° C. This curve can also be described by a node of an analog circuit or by an intermediate result in a digital implementation.

Along the top edge of the sail of FIG. 17, against the 100% relative humidity wall, for each degree the temperature rises, the dew point also rises by one degree. The slope at this edge (100% relative humidity) is therefore 1:1. The slope at the lower edge, at 5% relative humidity, is 0.632:1. The way the slopes transition from 1:1 to 0.632:1 as relative humidity changes can also be described by a node of an analog circuit or by an intermediate result in a digital implementation.

Figure 18:
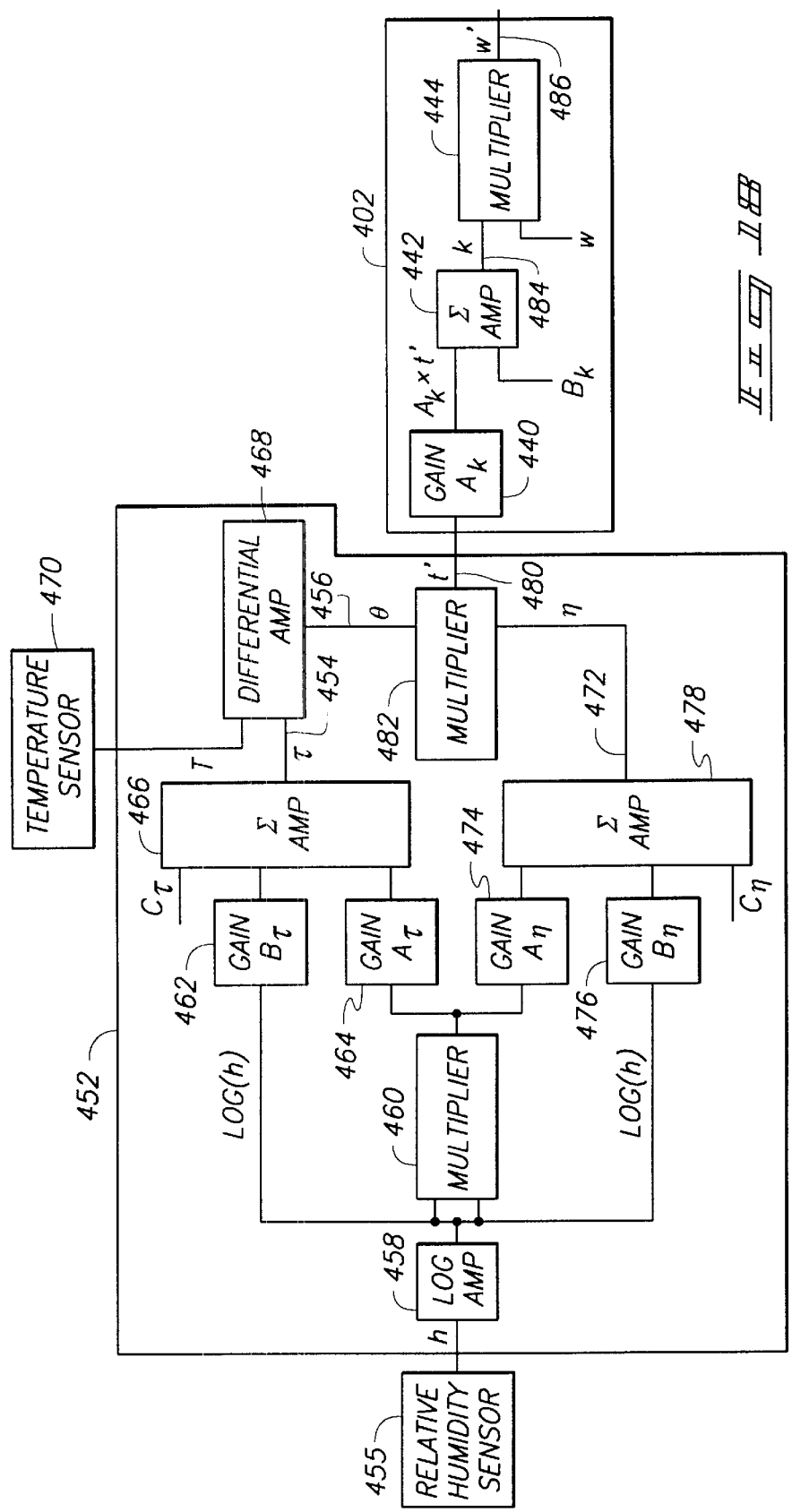
FIG. 18 is a block diagram of circuitry used to determine dewpoint from relative humidity and temperature as well as circuitry to transform the dewpoint signal into a linear or semi-linear compensation factor for the MOS gas sensor.

Using such analysis, the inventor has designed an analog circuit 452 (FIG. 18) capable of outputting dew point when given the inputs of relative humidity and temperature. FIG. 18 illustrates nodes which describes intermediate signals or calculations as will be described below:

The temperature signal τ that correlates to a dew point of −20° C. is provided at a node 454 and is determined using a humidity signal h from, for example, a humidity sensor 455. The signal h is converted into the temperature signal that correlates to a particular dew point, −20° C. in the illustrated embodiment. This is determined by finding the temperature on the base intersection curve in FIG. 17. This is performed by considering the following equation:

$$\tau = A\tau * LOG(h)^2 + B\tau * LOG(h) + C\tau$$

where h is the relative humidity signal in full percentage counts, such as "50" for 50% relative humidity ($1 \leq h \leq 100$); $A\tau = 5.65$; $B\tau = -44.3$; $C\tau = 66.14$; and $\tau$=temperature, in Kelvins beyond a −20° C. baseline, at which h correlates to a dew point of −20° C. ($0.14 \leq \tau \leq 66.14$).

More particularly, the circuit 452 includes a logarithmic amplifier 458 having an output, and having an input coupled to the humidity sensor 455. The circuit 452 further includes a multiplier 462 having an output, and having an input coupled to the output of the logarithmic amplifier 458. The circuit 452 further includes an amplifier 462 having an output, and an input coupled to the output of the logarithmic amplifier 458. The amplifier 462 has a gain which is set or selected so as to multiply the output of the logarithmic amplifier 458 (i.e., log (h)) by a constant $B\tau$. Similarly, the circuit 452 further includes an amplifier 464 having an output, and having an input coupled to the output of the multiplier 460. The amplifier 464 has a gain set so as to multiply the output of the multiplier 460 by a constant $A\tau$. The circuitry 452 further includes a summing amp 466 having an output defining the node 454 at which the signal r is produced. The summing amplifier 466 has an input coupled to the output of the amplifier 462, an input coupled to the output of the amplifier 464, and an input coupled to a signal representing the constant $C\tau$.

The difference between the temperature signal T, and the temperature signal that correlates to a dew point of −20° C., $\tau$, is provided at a second node 456. This difference is calculated as follows: $\theta = T - \tau$ where $\theta$ is the differential temperature in Kelvins (clipped, in the illustrated embodiment, e.g. to $1.91 \leq \theta \leq 86.09$), and T is the temperature, in Kelvins beyond a −20° C. baseline, of the relative humidity sensor 455 ($20 \leq T \leq 96$).

More particularly, the circuit 452 includes a differential amplifier 468 which has an output, an input coupled to the output of the summing amplifier 466, and further has an input coupled to a temperature sensor 470.

A signal representative of how far to go around the curve in FIG. 17 is provided at a node 472. The output at node 472 is a scaling factor ($\eta$) which determines the dew point vs. temperature slope; i.e., the rate at which the dew point changes as temperature changes. This scaling factor is calculated as follows:

$$\eta = A\eta * LOG(h)^2 + B\eta * LOG(h) + C\eta$$

where $\eta$ is the scaling factor ($0.4891 \leq \eta \leq 1$), $A\eta = 0.03894$, $B\eta = 0.17781$, and $C\eta = 0.48911$.

More particularly, the circuit 452 includes an amplifier 474 having an output, and having an input coupled to the multiplier 460. The amplifier 474 has a gain which is set or selected so as to multiply the output of the multiplier 460 by a constant $A\eta$. Similarly, the circuit 452 further includes an amplifier 476 having an output, and having an input coupled to the output of the logarithmic amplifier 458. The amplifier 476 has a gain set so as to multiply the output of the logarithmic amplifier 458 (i.e., log (h)) by a constant $B\eta$. The circuitry 452 further includes a summing amplifier 478 having an output defining the node 472 at which the signal $\eta$ is produced. The summing amplifier 472 has an input coupled to the output of the amplifier 476, an input coupled to the output of the amplifier 474, and an input coupled to a signal representing the constant $C\eta$.

Both the output signals $\tau$ and $\eta$ can be defined by straightforward linear, second-order polynomial transformations of the log of relative humidity h.

The differential temperature ($\theta$), scaled by the factor of $\eta$, and (logically) offset is provided at a node 480. This is calculated as follows:

$$t' = (\theta * \eta) - 20$$

where t' is the dew point in ° C. (clipped, in the illustrated embodiment, to $-18.5 \leq t' \leq 55$).

More particularly, the circuitry 452 includes a multiplier 482 having an output defining the node 480 at which the signal t' is produced, having an input coupled to the output of the summing amplifier 478, and having an input coupled to the differential amplifier 468.

The above formulae used to design the circuitry 452 can be consolidated into a single formula as follows:

$$t' = (T - A\tau * LOG(h)^2 + B\tau * LOG(h) + C\tau)) * (A\eta * LOG(h)^2 + B * LOG(h) + C\eta) - 20$$

Figure 16:
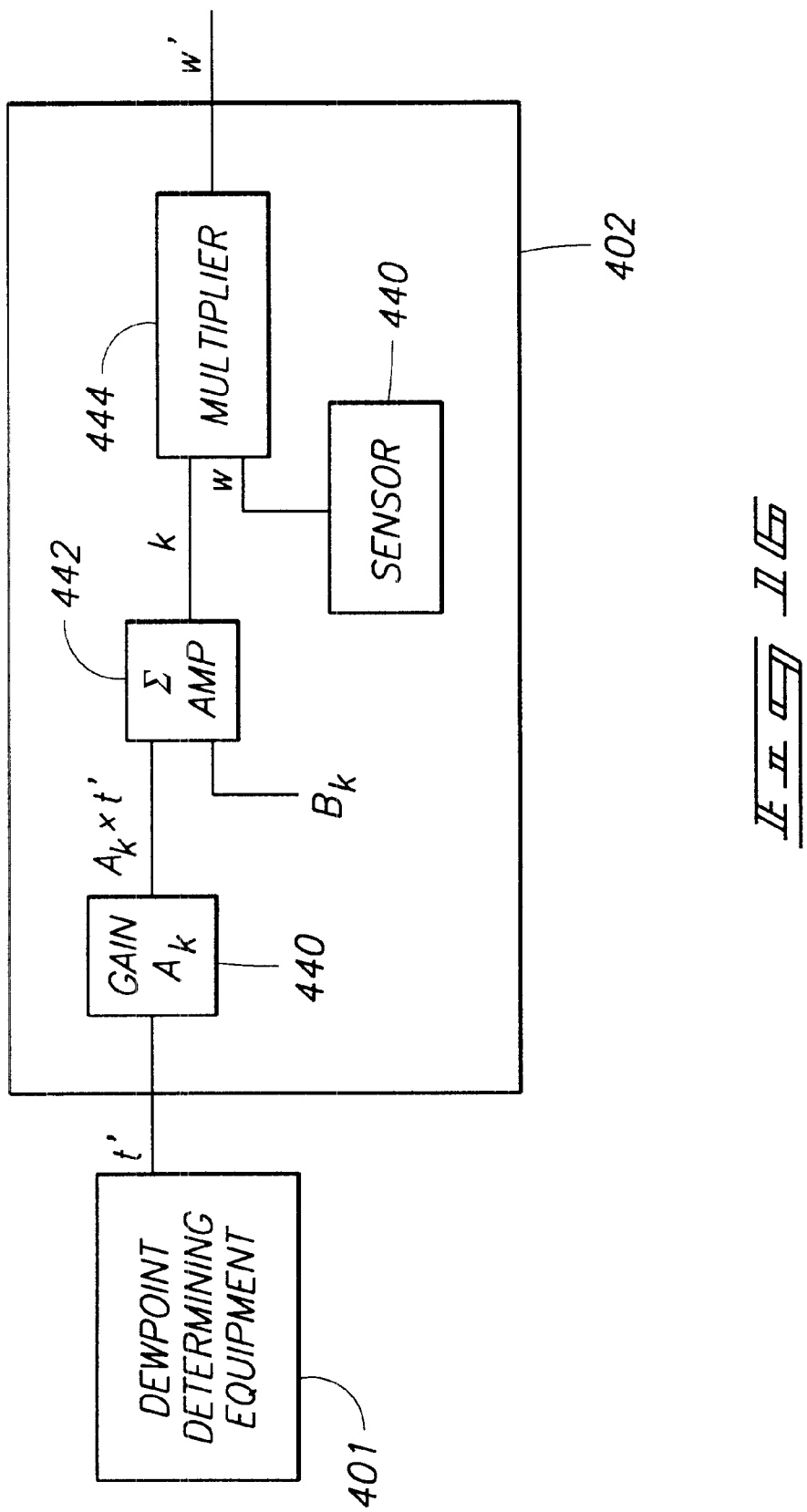
FIG. 16 is a block diagram illustrating the circuitry utilized to transform a dewpoint signal into a linear or semi-linear compensation factor and multiply that same compensation factor by the output of the MOS gas sensor.

Circuitry similar to that used in FIG. 16, like reference numerals indicating like components, takes the dew point signal t' and determines a compensation factor for the MOS gas sensor 440.

In the illustrated embodiment, the output of the amplifier 442 defines a node 484 that generates compensation factors k ranging between 0.6619 (−18.5° C. dew point) and 1.463 (55° C. dew point). This range of compensation factors will compensate for environmental Rs/Ro values ranging from 1.511 (the reciprocal of 0.6619) through 0.6835 which is the lowest expected value in the fuel cell of the illustrated embodiment. A dew point value of 12.52° C. is equivalent to a compensation factor of unity.

The output of the multiplier 444 defines a node 486 which can be analogized to accepting the k signal and multiplying it by the uncorrected sensor resistance signal (w). If, for example, k=1.405 then a w of 1000Ω would become a corrected gas concentration signal (w') of 1405Ω. This corrected resistance signal could then be imagined as being passed on to a final node where it is converted from a logarithmic resistance signal into a linear voltage signal. In actuality, because sensors of the type used for the sensor 440 vary in sensitivity to hydrogen, k is best handled as a log offset in a log amplifier in order that the effects of humidity can be variably "gained" while each circuit is calibrated for its sensitivity to hydrogen.

The circuitry 452 of FIG. 18 produces errors of less than 0.72 K between 10 and 70° C. and relative humidities of between 5 and 100%. Between 20 and 60° C., the circuitry 452, which is provided by way of example, produces dew points with an average accuracy of ±0.15 K and a median accuracy of 0.09 K. As illustrated in FIG. 19, the maximum errors occur along a curve where temperatures and relative humidities equal dew points of exactly 0° C. The reason for this is complex. These formulae produce their worse-case error at a temperature of 20.2° C. and a relative humidity of 25.7928% which is one of the points equal to a dew point of exactly 0° C. At this point, these formulae return a value—and error—of +0.7138° C. which is equal to a relative humidity error of +1.424%. Because even high quality relative humidity sensors have part-to-part interchangeability guarantees of only ±3%, the circuitry 452 (and formulae used to design it) produce dew points with accuracies exceeding that of its input sensors.

The source of the errors is caused by the way water's equation of state changes slightly below 0° C. On the 100% relative humidity line, this has the effect of making the slope change direction slightly below a temperature of 0° C. These errors can occur even at high temperatures as long as the dew points are equal to 0° C.

The point where the worse possible error occurs is at 20.2° C. and a relative humidity of 25.7928%. The fully saturated vapor pressure over water at 20.2° C. is 17.753 mmHg. By taking 25.7928% of this value, a vapor pressure of 4.579 mmHg is calculated. To determine what dew point is associated with a vapor pressure of 4.579 mmHg, you must determine what temperature water must be to achieve a fully saturated vapor pressure of 4.579 mmHg. The answer is 0° C. This is also the point where water's equation of state (its slope) makes a slight direction change. Since this formula provides a straight line between −20 and +70° C., the line will reach its maximum divergence from nature at 0° C. because this is where nature has a crook in the line. The errors tend to occur at dew points of 0° C.°—not at ambient temperature of 0° C.—because any time a question of dew point is asked where the answer is 0° C., a comparison is necessarily made to water and its vapor pressure at an ambient temperature of 0° C.

Therefore, in one embodiment (not shown), the majority of this residual error is eliminated by moving the baseline dew point from −20° C. to 0° C. and then using a bipolar circuit for calculating η differently above and below 0° C. However, there is another source of error. The 2nd-order polynomial fit for τ (the shape of the curve at the base intersection) transitions through a temperature of 0° C. and the same effect occurs in this alternative embodiment too. With a −20° C. baseline, τ benefits from an improved fit by providing it too, in yet another alternative embodiment (not show) with a bipolar amplifier with slightly different curves on both sides of the 16.896% relative humidity point (which is the 0° C. temperature point). However, using a bipolar amplifier for τ becomes a moot issue, in one embodiment, by moving the η baseline intersection upwards to 0° C., because the τ curve would then begin at 0° C. (at 100% relative humidity).

FIG. 20 is a flowchart illustrating logic used by digital circuitry or by a programmed general purpose computer, a microprocessor, or an integrated circuit, for determining dew point from relative humidity and temperature. In one embodiment, the digital circuitry that implements the logic of the flowchart is defined by the controller 250.

In step S1, relative humidity is input (e.g., from a relative humidity sensor such as the sensor 455). After performing step S1, the controller proceeds to step S2.

In step S2, temperature is input (e.g., from a temperature sensor such as the sensor 470). It will be readily apparent that steps S1 and S2 can be reversed. After performing step S2, the controller proceeds to step S3.

In step S3, dew point is calculated using a formula, such as:

$$t' = (T - A\tau*LOG(h)^{\wedge}2 + B\tau*LOG(h) + C\tau))*(A\eta*LOG(h)^{\wedge}2 + B\eta*LOG(h) + C\eta) - 20$$

where t' is dew point; T is the temperature input in step S2; h is the relative humidity signal in full percentage counts; such as "50" for 50% relative humidity ($1 \leq h \leq 100$); Aτ is a constant, e.g. 5.65; Bτ is a constant, e.g. −44.3; Cτ=66.14; and τ is temperature, in Kelvins beyond a −20° C. baseline, at which h correlates to a dew point of −20° C. ($0.14 \leq \tau \leq 66.14$). After performing step S3, the controller proceeds to step S4.

In step S4, the dew point is output or used; e.g., for compensating a gas sensor for the effects of temperature and humidity on the sensor.

As noted earlier in addition to the aforementioned temperature and dewpoint problems, many MOS sensors have cross-sensitivities to non-target gases. For example, if the target gas is hydrogen and the selected sensor has a cross-sensitivity to alcohol (as does the Figaro TGS813, for example), then even a perfumed person walking by the sensor can provoke a hydrogen alarm. The sensor 400 used in the illustrated embodiment is preferably selected with cross-sensitivity in mind. For example, the Figaro TGS821, which is used as the sensor 400 in the illustrated embodiment, is less susceptible than other commercial models, including the Figaro TGS813, but this effect can still cause problems during operation and startup.

Still further, this cross-sensitivity causes problems at startup because high-molecular-weight volatile organic compounds (VOCs) can deposit onto the sensor element while the fuel cell is off (and the sensor element is cold). Upon startup, the volatile organic compounds begin to decompose and evaporate. When exposed to increasing temperature the sensor 400 can sense these byproducts and can output false positives upon startup as earlier noted. Though the sensor element may reach operating temperature within about a minute, it can take several minutes to boil off or remove stubborn volatile organic compounds and obtain a stable reading.

In the case of the Figaro model TGS813 sensor, for example, the manufacturer recommends accelerating this process by applying 6 V to the heater for 60 seconds. This raises the sensor temperature to about 600° C. to cause a substantially instant burn-off of stubborn volatile organic compounds that would otherwise only more slowly burn-off at ≦500° C. The manufacturer does not provide similar information on the TGS821, the model used for the sensor 400 in the preferred embodiment. The manufacturer however, does advise that the burn-off time can be accelerated for another of their sensors, the TGS812, by applying 6.5 V for 15 seconds. After this application period of extra voltage, 5 V is then applied and, after waiting for about another half-minute period for the reading to stabilize, the sensor can be expected to provide valid data.

The sensor element inside the model TGS821 and which is used for the sensor 400 in one embodiment of the invention, normally operates at 500° C. and, according to the manufacturer, should not experience temperatures in excess of 600° C. (the maximum recommended temperature). For this model, an input of 6.0 V to the sensor 400 will produce a 600° C. equilibrium temperature. It takes about one minute of heating for the sensor element to ramp up and stabilize at either of these 500 to 600° C. equilibrium temperatures.

In accordance with the present invention, the sensor is exposed to a much higher voltage than the voltage associated with the sensor's maximum recommended temperature, for a short time, to rapidly raise the temperature of the sensor to its maximum recommended temperature. When this is achieved, the voltage is then reduced below the voltage associated with the sensor's normal operating temperature, or completely eliminated to cause the sensor to achieve its normal operating temperature. When this occurs a voltage appropriate to produce the normal operating temperature is applied at the time the sensor reaches its normal operating temperature.

For example, for the Figaro model TGS821, and in the embodiment shown in FIG. 21, the sensor 400 is exposed to a voltage greater than the voltage for maintaining the sensor 400 at its maximum recommended temperature, for a first predetermined amount of time. For example, in one embodiment, the sensor 400 is exposed to between 5.0V and 7.5 V for a first predetermined amount of time. In a more specific embodiment, the sensor 400 is exposed to about 7.5 V for a first predetermined amount of time.

In the example, above, the first predetermined amount of time is less than 60 seconds. In another specific embodiment, the first predetermined amount of time is less than 30 seconds. In a still more specific embodiment, the first predetermined amount of time is less than 15 seconds. In a further embodiment, the first predetermined amount of time is about 10 seconds. In another specific embodiment, the sensor 400 is exposed to 7.5 V for 10 seconds. As noted above, the first predetermined amount of time is selected to cause the sensor to reach the maximum recommended temperature; i.e., 600° C. as quickly as possible.

At this point, instead of applying the operating voltage; e.g., 5.0 V in one embodiment, and waiting for the sensor temperature to decay to its equilibrium temperature, the voltage is reduced below the operating voltage for a second predetermined amount of time thereby causing the sensor to cool more rapidly than if the operating voltage is applied after providing the high voltage. In the embodiment shown in FIG. 21, the power is eliminated for a period of time. In one embodiment, the second predetermined amount of time is between 1.4 and 3.4 seconds. In a more specific embodiment, the second predetermined amount of time is between 1.9 and 2.9 seconds. In a still more specific embodiment, the second predetermined amount of time is about 2.4 seconds. For example, in the illustrated embodiment, the power is cut off for 2.4 seconds and only then is the operating voltage; e.g., 5.0 V, applied.

Following the step noted above, and in the illustrated embodiment, at the time the sensor element 400 is crossing its normal operating temperature, normal heater power is applied. In the illustrated embodiment, normal heater power is applied at a predetermined period of time after power has been eliminated or reduced, and this predetermined amount of time is on the one hand, generally or carefully selected to match the approximate time that the sensor element is reaching its normal operating temperature with whatever level of precision is desired.

Because of the extremely low thermal mass of the system, there is no observable thermal inertia to this technique. In other words, the sensor operates normally without being affected by how rapidly it moved from the maximum recommended temperature to the normal operating temperature; e.g., from 600° C. to 500° C. This allows the sensor to be quickly rendered operational. In one embodiment, the sensor is rendered operational in less than 30 seconds. In a more particular embodiment, the sensor is operational in less than 15 seconds. In a still more particular embodiment, the sensor is started-up in about 12.4 seconds.

A fast startup time; e.g., only 12.4 seconds for the embodiment of FIG. 21, is advantageous for fuel cells used in standby power applications.

Although specific temperatures and voltages are shown in FIG. 21, variations are, of course, possible. While specific voltage examples have been given, it will be readily apparent that these values could have been expressed as power values in Watts. It is well known that power is directly proportional to voltage. In the illustrated embodiment, applying 600 mW of power maintains the sensor at the operating temperature of 500° C. Thus, while specific voltages have been given, the relative proportion of these voltage numbers is more significant than the actual specific examples themselves.

This rapid startup technique is implemented, in one embodiment, in the circuitry 402 associated with the sensor. In one embodiment, whenever power is applied to the circuitry 402, it automatically performs the rapid startup technique by selectively coupling the heater of the sensor to the various voltages for the predetermined amount of times using a timer and simple switching. However, rapid startup involves modulating heater voltages. Accordingly, in the preferred embodiment, the commands for rapid startup come from the fuel cell system's controller 250.

In one embodiment, shown in FIG. 22, heater modulation commands come from the controller 250 in the forms of a two-bit word via a parallel communication port (not shown) of the controller 250. In the embodiment shown in FIG. 22, 7.50, zero, and 5.00 V are used for rapid startup.

Thus, a method for speeding startup of a sensor has been provided.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for quickly rendering a MOS gas sensor operational and which has a sensor element for sensing a target gas, and a heater configured to heat the sensor element when a voltage is applied thereto, the heater having an operating temperature which is selectively maintained by applying a first voltage thereto, and wherein the heater has a maximum recommended temperature which is selectively maintained by applying a second voltage thereto, the maximum recommended temperature being higher than the operating temperature, and the second voltage being higher than the first voltage, the method comprising:

providing a third voltage to the heater, which is greater than the second voltage for a predetermined amount of time which is selected to increase the temperature to, but not above, the maximum recommended temperature in a shorter time period than if the second voltage is applied and maintained;

causing the heater to cool in a shorter time period than if the first voltage is applied; and providing the first voltage after causing the heater to cool.

2. A method for quickly rendering a MOS gas sensor operational in accordance with claim 1, wherein causing the heater to cool further comprises reducing the voltage provided to the heater from the third voltage, to a fourth voltage which is less than the first voltage.

3. A method for quickly rendering a MOS gas sensor operational in accordance with claim 2, wherein reducing the voltage comprises cutting off the voltage provided to the heater.

4. A method for quickly rendering a MOS gas sensor operational in accordance with claim 3, wherein the first voltage is provided to the heater after cutting off the voltage provided to the heater.

5. A method for quickly rendering a MOS gas sensor operational in accordance with claim 4 wherein the MOS gas sensor senses a target gas comprising hydrogen.

6. A method for quickly rendering a MOS gas sensor operational and which has a sensor element for sensing a target gas, and a heater configured to heat the sensor element and which is responsive to a voltage applied thereto, and wherein the heater has an operating temperature which is selectively maintained by applying a first voltage thereto, and the heater further has a maximum recommended temperature which is selectively maintained by applying a second voltage thereto, and wherein the maximum recommended temperature is higher than the operating temperature, and the second voltage is higher than the first voltage, the method comprising:

provinding a third voltage to the heater which is greater than the second voltage, and which increases the temperature toward the maximum recommended temperature in a shorter time period than if the second voltage is applied and maintained;

reducing the voltage provided to the heater from the third voltage, to a fourth voltage which is less than the first voltage to reduce the temperature of the heater in a shorter time period than if the first voltage is applied and maintained; and providing the first voltage to the heater after reducing the voltage to the fourth voltage.

7. A method for quickly rendering a MOS gas sensor operational in accordance with claim 6, wherein the third voltage is provided for a predetermined amount of time.

8. A method for quickly rendering a MOS gas sensor operational in accordance with claim 6, wherein the third voltage is provided for a predetermined amount of time which is not greater than the time required to reach the maximum recommended temperature.

9. A method for quickly rendering a MOS gas sensor operational in accordance with claim 6, wherein the third voltage is provided for an amount of time which causes the heater to reach but not exceed the maximum recommended temperature.

10. A method for quickly rendering a MOS gas sensor operational in accordance with claim 6, wherein reducing the voltage comprises reducing the voltage for a predetermined amount of time.

11. A method for quickly rendering a MOS gas sensor operational in accordance with claim 6, wherein reducing the voltage comprises providing no voltage to the heater.

12. A method for quickly rendering a MOS gas sensor operational in accordance with claim 6, wherein reducing the voltage comprises reducing the voltage applied to the heater for an amount of time selected to bring the temperature of the heater down to the operating temperature.

13. A method for quickly rendering a MOS gas sensor operational in accordance with claim 6, wherein the gas sensor senses a target gas comprising hydrogen.

14. A method for quickly rendering a MOS hydrogen gas sensor operational, and which has a sensor element for sensing hydrogen gas, and a heater configured to heat the hydrogen gas in response to a voltage applied thereto, the heater having a pre-use temperature, an operating temperature which is selectively maintained by applying a first voltage thereto, and a maximum recommended temperature which is selectively maintained by applying a second voltage thereto, and wherein the maximum recommended temperature is higher than the operating temperature, and the second voltage is higher than the first voltage, the method comprising:

providing a voltage to the heater which is greater than the second voltage for a predetermined amount of time to increase the temperature of the heater from the pre-use temperature toward the maximum recommended temperature in a shorter time period than if the second voltage was applied;

reducing the voltage provided to the heater to a voltage less than the first voltage for a predetermined amount of time to reduce the temperature of the heater in a shorter period of time than if the first voltage was applied; and providing the first voltage to the heater.

15. A method for quickly rendering a MOS hydrogen gas sensor operational in accordance with claim 14, wherein the voltage which is greater than the second voltage is provided for an amount of time selected such that the heater reaches the maximum recommended temperature from the pre-use temperature in an amount of time less than half of the time required if the second voltage is applied and maintained.

16. A method for quickly rendering a MOS hydrogen gas sensor operational in accordance with claim 14, wherein the voltage which is greater than the second voltage is provided for a predetermined amount of time selected such that the heater reaches, but does not exceed, the maximum recommended temperature.

17. A method for quickly rendering a MOS hydrogen gas sensor operational in accordance with claim 14, wherein the voltage which is greater than the second voltage is provided for a predetermined amount of time which is not greater than the time period required to reach the maximum recommended temperature.

18. A method for quickly rendering a MOS hydrogen gas sensor operational in accordance with claim 14, wherein reducing the voltage comprises reducing the voltage for a predetermined amount of time.

19. A method for quickly rendering a MOS hydrogen gas sensor operational in accordance with claim 14, wherein reducing the voltage comprises providing no voltage to the heater.

20. A method for quickly rendering a MOS hydrogen gas sensor operational in accordance with claim 14, wherein reducing the voltage comprises cutting the voltage applied to the heater for an amount of time selected to bring the temperature of the heater down to the operating temperature.

21. A method for quickly rendering a MOS hydrogen gas sensor operational and which has a sensor element for sensing a target gas, and a heater configured to heat the sensor element, and which is responsive to a voltage applied thereto, the heater having a pre-use temperature, and an operating temperature which is selectively maintained by applying a first voltage thereto, the heater further having a maximum recommended temperature which is selectively maintained by applying a second voltage thereto, the maximum recommended temperature being higher than the operating temperature, and the second voltage being higher than the first voltage, the method comprising:

providing a third voltage to the heater which is greater than the second voltage, for a first predetermined period of time, the first predetermined period of time being selected based upon the value of the third voltage, and the amount of time necessary at the third voltage value to increase the temperature of the heater from the pre-use temperature to the maximum recommended temperature;

eliminating the application of voltage to the heater for a second predetermined period of time, the second predetermined period of time being selected based upon the amount of time required to reduce the temperature of the heater from the maximum recommended temperature to the operating temperature when no voltage is applied to the heater;

after eliminating the application of voltage to the heater, providing the first voltage to the heater; and using the sensor, after providing the first voltage to the heater.

22. A method for quickly rendering a MOS hydrogen gas sensor operational in accordance with claim 21, wherein the third voltage is provided for an amount of time which is selected such that the heater reaches the maximum recommended temperature from the pre-use temperature in an amount of time less than half of the time required if the second voltage is applied and maintained.

23. A method for quickly rendering a MOS hydrogen gas sensor operational in accordance with claim 21, wherein the third voltage is provided for a predetermined amount of time which causes the heater to reach, but not exceed, the maximum recommended temperature.

24. A method for quickly rendering a MOS hydrogen gas sensor operational in accordance with claim 21, wherein the third voltage is provided for a predetermined amount of time which is not greater than the time required to reach the maximum recommended temperature.

25. A method of speeding startup of a MOS hydrogen gas sensor in accordance with claim 21 wherein the third voltage is between 5 and 7.5 volts.

26. A method for quickly rendering a MOS hydrogen gas sensor operational in accordance with claim 21, wherein the third voltage value is about 7.5 volts.

27. A method for quickly rendering a MOS hydrogen gas sensor operational in accordance with claim 26, wherein the first predetermined period of time is less than about 60 seconds.

28. A method for quickly rendering a MOS hydrogen gas sensor operational in accordance with claim 26, wherein the first predetermined period of time is less than about 30 seconds.

29. A method for quickly rendering a MOS hydrogen gas sensor operational in accordance with claim 26, wherein the first predetermined period of time is less than about 15 seconds.

30. A method for quickly rendering a MOS hydrogen gas sensor operational in accordance with claim 26, wherein the first predetermined amount of time is about 10 seconds.

31. A method for quickly rendering a MOS hydrogen gas sensor operational in accordance with claim 30, wherein the second predetermined period of time is between about 1.4 to about 3.4 seconds.

32. A method for quickly rendering a MOS hydrogen gas sensor operational in accordance with claim 30, wherein the second predetermined period of time is between about 1.9 to about 2.9 seconds.

33. A method for quickly rendering a MOS hydrogen gas sensor operational in accordance with claim 30, wherein the second predetermined period of time is about 2.4 seconds.

34. A method for quickly rendering a MOS hydrogen gas sensor operational in accordance with claim 21, wherein the sensor is rendered operational in less than about 30 seconds.

35. A method for quickly rendering a MOS hydrogen gas sensor operational in accordance with claim 30, wherein the sensor is rendered operational in less than about 15 seconds.

36. A method for quickly rendering a MOS hydrogen gas sensor operational in accordance with claim 21, wherein the sensor is rendered operational in about 12.4 seconds.

37. A method for quickly rendering a MOS hydrogen gas sensor operational, and which has a sensor element for sensing a target gas, and a heater configured to heat the sensor element following the application of a voltage thereto, and wherein the heater has a pre-use temperature; and an operating temperature of about 500 degrees Celsius which is selectively maintained by applying a voltage of about 5.0 Volts thereto, and wherein the heater further has a maximum recommended temperature of about 600 degrees Celsius which is selectively maintained by applying a voltage of about 6.0 Volts thereto, the method comprising:
   providing a voltage of about 7.5 Volts to the heater for about 10 seconds;
   eliminating the application of the voltage to the heater for about 2.4 seconds after first providing the voltage of about 7.5 Volts; and
   providing about 5.0 Volts to the heater after eliminating the application of the voltage.

38. A method for quickly rendering a MOS gas sensor operational, and which has a sensor element for sensing a target gas, and a heater configured to heat the sensor element following the application of a voltage thereto, the heater having a pre-use temperature; and an operating temperature of about 500 degrees Celsius which is selectively maintained by applying a voltage of 5.0 Volts thereto, and wherein the heater has a maximum recommended temperature of about 600 degrees Celsius which is selectively maintained by applying a voltage of 6.0 Volts thereto, the method comprising:
   providing a voltage of 7.5 Volts to the heater for about 10 seconds;
   eliminating the voltage to the heater for about 2.4 seconds after providing the voltage of 7.5 Volts; and
   providing 5.0 Volts to the heater after eliminating the voltage.

39. A MOS gas sensor system comprising:
   a MOS gas sensor having a sensor element for sensing a target gas, and a heater configured to heat the sensor element and which is responsive when a voltage is applied thereto, and wherein the heater has an operating temperature which is selectively maintained by applying a first voltage thereto, and the heater further has a maximum recommended temperature which is selectively maintained by applying a second voltage thereto, and wherein the maximum recommended temperature is higher than the operating temperature, and the second voltage is higher than the first voltage; and
   circuitry configured to provide a third voltage to the heater which is greater than the second voltage for a predetermined amount of time which is selected to increase the temperature to a level which is not above the maximum recommended temperature in a time period which is less than if the second voltage is applied and maintained, the circuitry being further configured to, after providing the third voltage, reduce the voltage provided to the heater from the third voltage, to a fourth voltage, which is less than the first voltage and to further reduce the temperature of the heater in a shorter time period than if the first voltage is applied and maintained.

40. A MOS gas sensor system in accordance with claim 39 wherein the fourth voltage is zero.

41. A MOS gas sensor system in accordance with claim 40 wherein the circuitry is further configured to provide the first voltage to the heater for a predetermined amount of time after the fourth voltage is provided to the heater.

42. A MOS gas sensor system in accordance with claim 40 wherein the circuitry is further configured to maintain provision of the first voltage to the heater for a predetermined amount of time, after the fourth voltage is provided to the heater.

43. A fuel cell system comprising:
   a housing, the housing having a fuel gas inlet and an exhaust outlet;
   at least one ion exchange fuel cell membrane within the housing;

a MOS gas sensor including a sensor element for sensing a target gas and a heater configured to heat the sensor element and which is energized when a voltage is applied thereto, and wherein the heater has an operating temperature which is selectively maintained by applying a first voltage thereto, and the heater further has a maximum recommended temperature which is selectively maintained by applying a second voltage thereto, the maximum recommended temperature being higher than the operating temperature, and wherein the second voltage is higher than the first voltage; and a controller coupled in controlling relation relative to the ion exchange fuel cell membrane and to the MOS gas sensor and which provides a third voltage to the heater, which is greater than the second voltage for a predetermined amount of time which is selected to increase the temperature to a level to, but not greater than, the maximum recommended temperature in a shorter time period than if the second voltage is applied and maintained.

44. A fuel cell system in accordance with claim 44, and further comprising a fuel supply coupled to the fuel supply inlet of the housing.

45. A fuel cell system in accordance with claim 43, wherein the fuel supply comprises hydrogen gas, and wherein the MOS sensor of the MOS gas sensor system is configured to sense the concentration of hydrogen gas.

* * * * *

UNITED STATES PATENT AND TRADEMARK OFFICE
CERTIFICATE OF CORRECTION

PATENT NO.    : 6,467,334 B2
DATED         : October 22, 2002
INVENTOR(S)   : Greg A. Lloyd et al.

It is certified that error appears in the above-identified patent and that said Letters Patent is hereby corrected as shown below:

Column 3,
Line 2, please replace "problems at A startup because" with -- problems at startup because --

Column 7,
Line 41, please replace "this arrangement, the cathode side A 102" with -- this arrangement, the cathode side 102 --

Column 13,
Line 7, please replace "provided t o illustrate the principals" with -- provided to illustrate the principals --
Lines 17-18, please replace "an d a second anode heat sink" with -- and a second anode heat sink --

Column 17,
Line 37, please replace "Y-axis have been rep laced" with -- Y-axis have been replaced --
Line 63, please replace "modified by the conditioning circuitry 42." with -- modified by the conditioning circuitry 402. --

Column 18,
Line 18, please replace "normalized during calibration to an a of -0.725 before" with -- normalized during calibration to an $\alpha$ of -0.725 before --
Line 20, please replace "in alternative embodiments, the sensor's a need" with -- In alternative embodiments, the sensor's $\alpha$ need --

Column 19,
Line 30, please replace "r is produced." with -- $\tau$ is produced. --

Column 20,
Line 24, please replace "B*LOG(h)+C$\eta$)-20" with -- B$\eta$*LOG(h)+C$\eta$)-20 --

UNITED STATES PATENT AND TRADEMARK OFFICE
CERTIFICATE OF CORRECTION

PATENT NO.   : 6,467,334 B2
DATED        : October 22, 2002
INVENTOR(S)  : Greg A. Lloyd et al.

It is certified that error appears in the above-identified patent and that said Letters Patent is hereby corrected as shown below:

Column 24,
Line 24, please replace "preferred forms of puffing the invention" with -- preferred forms of putting the invention --

Column 30,
Line 6, please replace "A fuel cell system in accordance with claim 44," with -- A fuel cell system in accordance with claim 43, --

Signed and Sealed this

Second Day of September, 2003

JAMES E. ROGAN
*Director of the United States Patent and Trademark Office*